US008346985B2

(12) United States Patent
Chassot et al.

(10) Patent No.: US 8,346,985 B2
(45) Date of Patent: Jan. 1, 2013

(54) RECEIVER CONFIGURED TO PAIR TO MULTIPLE WIRELESS DEVICES

(75) Inventors: Jacques Chassot, Bussy (CH); Xavier Bize, Gex (FR); Eric Tissot-Dupont, San Francisco, CA (US); Philippe Chazot, Saint Jorioz (FR); Tarak Fekih, Concise (CH); Pierre Chenes, Eclepens (CH)

(73) Assignee: Logitech Europe S.A., Romanel-Sur Morges (CH)

( * ) Notice: Subject to any disclaimer, the term of this patent is extended or adjusted under 35 U.S.C. 154(b) by 42 days.

(21) Appl. No.: 12/774,666

(22) Filed: May 5, 2010

(65) Prior Publication Data

US 2011/0029692 A1 Feb. 3, 2011

Related U.S. Application Data

(60) Provisional application No. 61/230,665, filed on Jul. 31, 2009, provisional application No. 61/228,916, filed on Jul. 27, 2009.

(51) Int. Cl.
*G06F 3/00* (2006.01)
*H03K 17/94* (2006.01)
(52) U.S. Cl. ............................................. 710/8; 341/22
(58) Field of Classification Search ......... 710/8; 341/22
See application file for complete search history.

(56) References Cited

U.S. PATENT DOCUMENTS

| 2007/0162949 | A1* | 7/2007 | Nitta et al. ..................... 725/134 |
| 2008/0158021 | A1* | 7/2008 | Sheehan et al. .................. 341/22 |
| 2009/0157924 | A1 | 6/2009 | Scales et al. |
| 2010/0180050 | A1 | 7/2010 | Hsiao et al. |
| 2011/0246680 | A1 | 10/2011 | Chassot et al. |

FOREIGN PATENT DOCUMENTS

CN 101968775 A 9/2011

OTHER PUBLICATIONS

Non-Final Office Action for U.S. Appl. No. 13/080,640 mailed Nov. 14, 2011, 9 pages.

* cited by examiner

*Primary Examiner* — Hyun Nam
(74) *Attorney, Agent, or Firm* — Kilpatrick Townsend & Stockton LLP

(57) ABSTRACT

A computer system includes a receiver configured to pair with a set of peripheral devices and have active connections with a first subset of the peripheral devices and inactive connections with a second subset of the peripheral devices. The first and the second subsets of peripheral devices are subsets of the set of peripheral devices. If a select one of the peripheral devices in the inactive set of peripheral devices is operated, the receiver is configured to activate a connection with the select one of the peripheral devices in a latency period that is below human perception levels of the latency period.

10 Claims, 16 Drawing Sheets

RECEIVER CONFIGURED TO PAIR TO MULTIPLE WIRELESS DEVICES

CROSS REFERENCE TO RELATED APPLICATIONS

This application claims the benefit of, and priority to, U.S. Provisional Application No. 61/228,916, filed Jul. 27, 2009, titled "RECEIVER CONFIGURED TO PAIR TO MULTIPLE WIRELESS DEVICES," of Jacques Chassot et al., and U.S. Provisional Application No. 61/230,665, filed Jul. 31, 2009, titled "RECEIVER CONFIGURED TO PAIR TO MULTIPLE WIRELESS DEVICES," of Jacques Chassot et al., both of which are incorporated by reference herein in their entireties for all purposes.

BACKGROUND OF THE INVENTION

The present invention generally relates to peripheral devices, such as human interface devices, configured for use with a computer. More specifically, the present invention relates to a receiver configured to pair to multiple peripheral devices, and a software module configured to operate on a computer to receive communications from the receiver for the peripheral devices where the receiver and software module operate together to present the communications to the computer so that the multiple peripheral devices may communicate with the computer without interference from one another.

Peripheral devices for computers include a diverse group of consumer products that are configured for use in conjunction with a computer. Peripheral devices include webcams, printers, hard drives, monitors, human interface devices (HIDs), projectors, plotters, speakers, scanners, digital cameras, video cameras, microphones, etc. Peripheral devices, such as HIDs, have traditionally included computer keyboards, computer mice, track balls, joysticks, and the like. Those of skill in the art will know of a number of other HIDs, which are commonly used with computers.

HIDs as well of other types of peripheral devices are commonly configured to communicate wirelessly with computers to perform their control functions, to exchange data with a computer, and the like. More specifically, HIDs are often configured to wirelessly communicate with a wireless receiver, which may be embedded in the computer (e.g., a Bluetooth ready portable computer) or may be plugged into a communication jack or slot on the computer (e.g., a universal serial bus (USB) receiver plugged into a USB port on the computer). As referred to herein, a receiver may be configured to both transmit and receive wireless communications.

The wireless connectivity interfaces for HIDs on a computer (e.g., personal computer, portable computer, etc.) is not widely standardized to date. As discussed briefly above, some computers provide embedded Bluetooth receivers for Bluetooth-HIDs, whereas other computers have no wireless connectivity available. One relatively ubiquitous connectivity option currently available on computers is USB connectivity, which supports HIDs.

For computers with USB connectivity, the market for wireless HIDs has seen development of proprietary wireless solutions. Proprietary wireless solutions include proprietary device drivers and the like where HIDs are delivered with a USB receiver (i.e., dongle), which may include the proprietary device drivers. Thereby, the USB receiver allows the HIDs to wirelessly connect to a computer for wireless communications with the computer.

One problem that has arisen in HID wireless connectivity with computers is that wireless proprietary HIDs follow the protocol that one HID is paired to one receiver, or at maximum two HIDs are paired to one receiver. For example, a mouse may be delivered with a USB receiver that is paired with the mouse, and must be plugged into one of the USB ports on a computer for use therewith, or a keyboard and mouse may be delivered with one USB receiver that is paired with the keyboard and mouse and must be plugged into one of the USB ports on a computer for use therewith.

If a user wants to use a large number of wireless HIDs with a computer, the number of USB receivers rapidly becomes a problem, using up many or all USB ports available on the computer. With the market shift from PC tower desktops towards portable computers, a large number of users want to move their portable computers between different use locations. For example, users want to move their portable computers for use at home, at a job location (e.g., an office), and during travel (e.g., from home to office). Further, these users often want to leave their sets of HIDs in place at a use location, and thus move only the portable computer during travel. For example, a user may want to use a full size keyboard with her portable computer at a job location and at home, but may not want to transport full size keyboards back and forth from home to a job location.

In view of the above outline problems, computer manufacturers, HIDs manufacturers and the like continue to strive to develop new HIDs and HIDs interfaces to solve these problems and others.

BRIEF SUMMARY OF THE INVENTION

The present invention generally relates to peripheral devices, such as human interface devices, configured for use with a computer. More specifically, the present invention relates to a receiver configured to pair to multiple peripheral devices, and a software module configured to operate on a computer to receive communications from the receiver for the peripheral devices where the receiver and software module operate together to present the communications to the computer so that the multiple peripheral devices may communicate with the computer without interference from one another.

According to one embodiment, a computer system includes a receiver configured to pair with a set of peripheral devices (such as a set of human interface devices) and have active connections with a first subset of the peripheral devices and inactive connections with a second subset of the peripheral devices. The first and the second subsets of peripheral devices are subsets of the set of peripheral devices. If a select one of the peripheral devices in the inactive set of peripheral devices is operated, the receiver is configured to activate a connection with the select one of the peripheral devices in a latency period that is below human perception levels of the latency period.

According to a specific embodiment, the receiver is configured to terminate an active connection for one of the peripheral devices having an active connection and having a period of non-use that is longer than others of the peripheral devices having active connections. According to another specific embodiment, the first subset of peripheral devices includes up to three peripheral devices. According to another specific embodiment, the receiver is configured to communicate on a plurality of pipes across an RF channel, wherein one of the pipes in the plurality of pipes is configured for reconnection, and the other pipes in the plurality of pipes are configured for active connections. The plurality of pipes may include four pipes.

According to one embodiment, a computer system includes a receiver configured to pair with a plurality of peripheral devices and have active connections with a set of the peripheral devices. The set of the peripheral devices includes a fewer number of peripheral devices than a number of peripheral devices in the plurality of peripheral devices. If a select one of the peripheral devices does not have an active connection to the receiver and the select peripheral device is operated, then i) the receiver is configured to terminate an active connection for one of the peripheral devices having an active connection and having a period of non-use that is longer than others of the peripheral devices having active connections, and ii) thereafter the receiver is configured to activate a connection with the select peripheral device.

According to a specific embodiment, the receiver is configured to communicate on a plurality of pipes across an RF channel. One of the pipes in the plurality of pipes is configured for reconnection, and the other pipes in the plurality of pipes are configured for active connections. The plurality of pipes may include four pipes. The set of peripheral devices may include up to three peripheral devices.

According to one embodiment, a computerized method is provided for a computer to interact with a plurality of peripheral devices where a complete set of control functions of the peripheral devices are operable on the computer. The method includes receiving by a computer from a receiver coupled to the computer an enumerator report having a peripheral device report and a device index included in a set of device indices, wherein the peripheral device report is sent from a select peripheral device to the receiver. The method further includes determining by the computer the device index in the enumerator report. The method further includes routing by the computer the peripheral device report to a device driver associated with the device index, wherein the device driver is configured to provide a complete set of operating function for a peripheral device associated with the device driver; and executing by the computer a command function from the peripheral device report issued by the select peripheral device.

According to a specific embodiment, the device driver is included in a set of device drivers, and each device driver is associated with a unique device index. According to another specific embodiment, the method further includes declaring to an operating system of the computer the plurality of peripheral devices.

According to one embodiment, a computerized method of pairing a peripheral device (such as a human interface device) to a receiver coupled to a computer includes launching by a computer a connect utility configured to direct a receiver coupled to a connector of the computer to enter a pairing mode. The method further includes receiving by the computer input for directing the connect utility to place the receiver in a pairing mode. The method further includes directing the receiver to enter pairing mode based on the received input. The method further includes directing a user by the computer to switch a slider switch on the peripheral device from off to on to place the peripheral device in a pairing mode. The receiver is configured to pair with the peripheral device if the receiver and peripheral device are both in pairing mode; and the receiver is configured to not pair with the peripheral device if the receiver or the peripheral device is not in pairing mode.

According to a specific embodiment, the method further includes: i) detecting by the computer another receiver coupled to another connector of the computer for a set of peripheral devices; ii) presenting by the computer a user query to a user for pairing the set of peripheral devices to the first mentioned receiver; and iii) receiving by the computer a user response to the query. If the user response includes an indicator for pairing the set of peripheral devices to the first receiver: then the method includes i) directing the user to unplug the other receiver from the computer, (if the user does not unplug the other receiver first, the set of peripheral devices will reconnect to the other receiver and will not enter pairing mode if their power switch is set to on) ii) directing the first receiver to enter a pairing mode, and iii) directing a user by the computer to switch a set of slider switches on the set of peripheral devices from off to on to place the set of peripheral devices in a pairing mode. The first receiver is configured to pair with the set of peripheral devices if the first receiver and set of peripheral devices are both in pairing mode. The first receiver is configured to not pair with the set of peripheral devices if the set of peripheral devices is not in pairing mode. If the user response includes an indicator for not pairing the set of peripheral devices to the first receiver: then the method includes: i) maintaining the pairing of the first peripheral device to the first receiver, and ii) maintaining the pairing of the set of peripheral devices to the other receiver. The foregoing described steps may be repeated for one or more subsequently detected receivers coupled to a connector of the computer.

According to one embodiment, a peripheral device is configured to communicate with a receiver over a wireless connection where the peripheral device includes a communication device paired with a first receiver and configured to communicate with the first receiver over a wireless connection; and a slider switch coupled to the communication device and configured to slide from an off state to an on state to power on the communication device. The communication device is configured to attempt to connect over the wireless connection to the first receiver, if the slider switch is slid from the off state to the on state. The communication device is configured not enter a pairing mode, if communication device connects to the first receiver after the slider switch is slid from the off state to the on state. The communication device is configured to enter pairing mode for a period of time and search for a second receiver in pairing mode to pair with, if the communication device does not connect to the first receiver after the slider switch is slid from the off state to the on state. The communication device is configured to pair with the second receiver and exit pairing mode after pairing with the second receiver, if the second receiver is located in pairing mode. The communication device is configured to exit pairing mode, if the second receiver is not located in pairing mode. According to one specific embodiment, the period of time is about 500 milliseconds or less. The communication device may include a processor and a transceiver.

According to one embodiment, a communication method if provided for a receiver to communicate with a set of peripheral device over a set of communication pipes. The method includes receiving in the receiver a report communicated over a service pipe from a first peripheral device, which does not have an active connection to the receiver; and determining in the receiver if the first peripheral device is paired with the receiver. If the first peripheral device is not paired with the receiver, the receiver ignores the report. If the first peripheral device is paired to the receiver, the receiver allocates a device pipe to the first peripheral device for wireless communications with the receiver. The method further includes placing a second peripheral device on hold, which was previously allocated a device pipe.

According to a specific embodiment, the receiver is configured to communicate actively with up to three peripheral devices over three devices pipes, the three peripheral devices are referred to as the second peripheral device, the third peripheral device, and the fourth peripheral device, and the step of placing the second peripheral device on hold includes determining by the receiver that the second peripheral device had a longest period of time among the second peripheral device, the third peripheral device, and the fourth peripheral device without communication with the receiver. The receiver is configured to ignore keep alive reports in determining that the second peripheral device had the longest period of time without communication with the receiver. The second peripheral device is placed on hold without communication from the receiver to the second peripheral device.

According to one embodiment, a computerize method is provided for identifying to a user of a user computer a peripheral device (such as a human interface device), which is active, from a set of human interface devices. The method includes presenting via a graphical user interface (GUI) on the computer a set of peripheral device identifiers that respectively identify each peripheral device in a set of peripheral devices; and receiving a report from a select one of the peripheral devices in the set of peripheral device. The method further includes displaying on the GUI a use identifier for the peripheral device identifier for the select one of peripheral devices so that the select one of the peripheral devices may be distinguished by a user from other ones of the peripheral devices in the set of peripheral devices.

According to another embodiment, a computer readable storage medium contains program instructions that, when executed by a controller within a computer, cause the controller to execute a method for a computer to interact with a plurality of peripheral devices where a complete set of control functions of the peripheral devices are operable on the computer. The method includes receiving by a computer from a receiver coupled to the computer an enumerator report having a peripheral device report and a device index included in a set of device indices. The enumerator report is sent from a select peripheral device to the receiver. The method further includes determining by the computer the device index in the enumerator report, and routing by the computer the peripheral device report to a device driver associated with the device index. The device driver is configured to provide a complete set of operating function for a peripheral device associated with the device driver. The method further includes executing by the computer a command function from the peripheral device report issued by the select peripheral device. The device driver is included in a set of device drivers, and each device driver is associated with a unique device index. According to a specific embodiment of the computer readable medium, the method further includes declaring to an operating system of the computer the plurality of peripheral devices. The peripheral devices include human interface devices.

According to another embodiment, a computerized method for re-pairing a set of peripheral devices to a replacement unifying receiver includes detecting by a computer a replacement unifying receiver inserted in a communication port of the computer; and receiving by the computer a user input instructing the computer to re-pair the set of peripheral devices to the replacement unifying receiver. The method further includes repeating the steps of: i) directing the receiver to enter pairing mode; ii) directing a user via the computer to switch a slider switch on the peripheral device from off to on to place the peripheral device in a pairing mode; and iii) re-pairing the peripheral device to the replacement unifying receiver, until a last peripheral device is re-paired to the replacement unifying receiver or until a stop command is received by the computer from a user to stop re-pairing the set of peripheral devices to the replacement unifying receiver. Prior to re-pairing the set of peripheral devices to the replacement unifying receiver, the replacement unifying receiver is not paired to other peripheral devices. The communication port may be a USB port. According to a specific embodiment, the detecting step includes interrogating a lookup table in the replacement unifying receiver to determine whether the lookup table is blank to determine that the replacement unifying receiver is configured for re-pairing to the set of peripheral devices.

According to another embodiment, a method of operating a peripheral device paired to a plurality of unifying receivers in a multi-master configuration includes storing by the peripheral device in a local memory of the peripheral device an address for each of the unifying receivers and an encryption key for a wireless link to each unifying receivers, and storing by the peripheral device in the local memory a priority level for communication with each of the unifying receivers. The method further includes receiving by the peripheral device a user input, and generating by the peripheral device data from the user input for transfer to one of the unifying receivers. The method further includes determining by the peripheral device from the local memory one of the unifying receivers having a highest priority level, and initiating a connection to the unifying receiver having the highest priority level. If the connection to the unifying receiver with the highest priority level is successful, the method includes transmitting the data to the unifying receiver with the highest priority level. If the connection to the unifying receiver with the highest priority level is not successful, then the method includes repeating the determining step, the initiating step, and the transmitting step for the unifying receiver having the next highest priority level until a connection to one of the unifying receivers is successful or the until connection will all of the unifying receivers fails. As described above, the peripheral device may be a human interface device.

According to a specific embodiment, the method further includes assigning the priority levels to the unifying receivers based on a temporal length from which the peripheral device had an active connection with each of the unifying receivers. The priority levels are assigned from highest to lowest corresponding to a shortest to a longest temporal length since connection with the unifying receivers.

According to another specific embodiment, the method further includes reassigning the priority levels by the peripheral device to the unifying receivers if in the initiating step a connection is made with one of the unifying receiver having a priority level less then the highest priority level. The step of reassigning may include: reassigning to the unifying receiver to which a connection is made, the highest priority level. According to one specific embodiment, the step of reassigning also includes reducing by one the priority levels of the other unifying receivers to which a connection was not made.

These and other embodiments of the present invention are described in more detail in conjunction with the text below and attached figures.

DETAILED DESCRIPTION OF THE INVENTION

The present invention generally relates to peripheral devices, such as human interface devices, configured for use with a computer. More specifically, the present invention provides a receiver configured to pair to multiple peripheral devices, and a software module configured to operate on a computer to receive communications from the receiver for the peripheral devices where the receiver and software module operate together to present the communications to the computer so that the multiple peripheral devices may communicate with the computer without interference from one another.

Figure 1A:
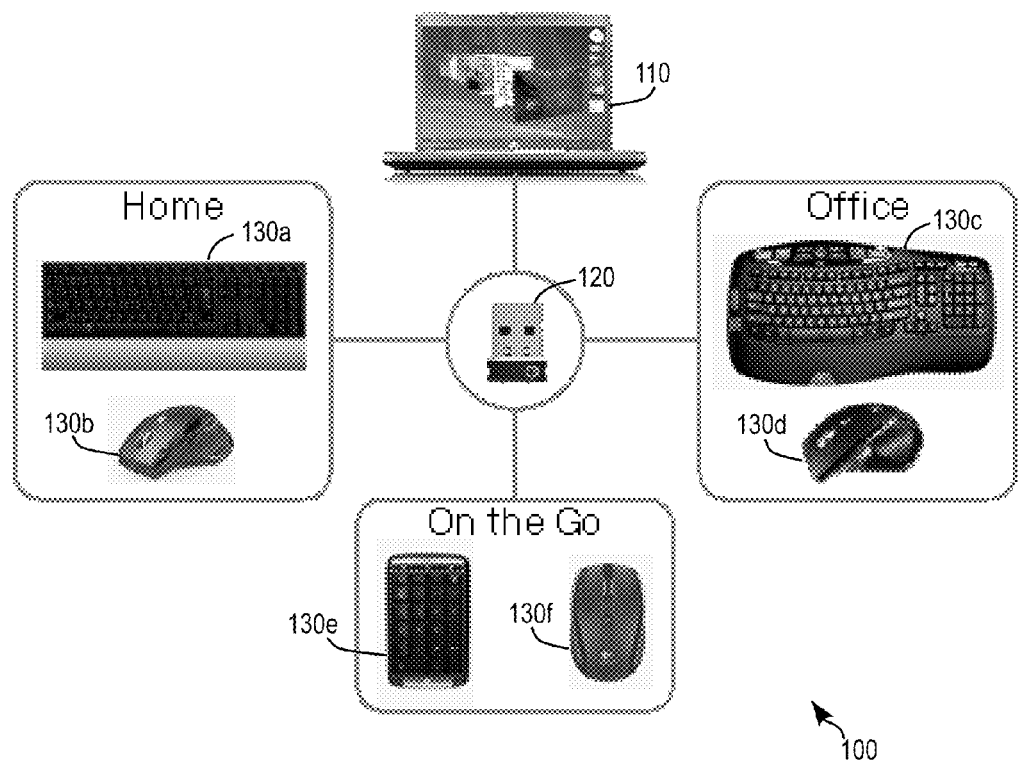
FIG. 1A is a simplified schematic of a computer system according to one embodiment of the present invention.
Figure 1B:
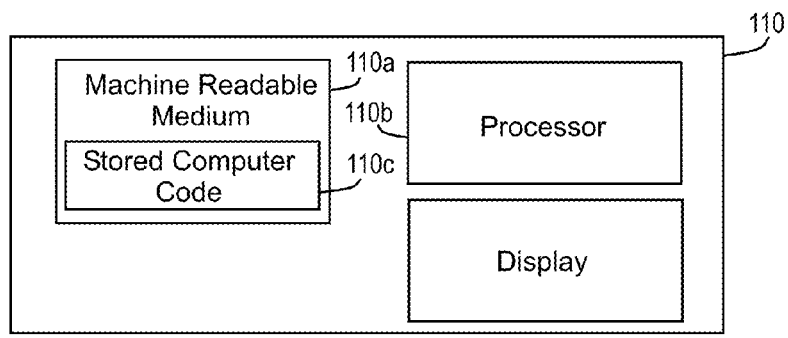
FIG. 1B is a simplified schematic of the portable computer that is shown in FIG. 1A.

FIG. 1A is a simplified schematic of a computer system 100 according to one embodiment of the present invention. The computer system includes a portable computer 110 and a unifying receiver 120. Portable computer 110 may include one or more machine readable mediums 110a (see FIG. 1B), such as a hard drive, an optical drives, a solid state memory or the like on which computer code according to various embodiments of the present invention may be stored. The portable computer may have one or more processors 110b (see FIG. 1B) configured to execute the computer code 110c (e.g., enumerator software described below in detail) stored on the machine readable memory to affect the various computer method embodiments of the present invention. The unifying receiver is relatively small and is configured to be plugged into the portable computer, and left in the portable computer for transport and for use in various locations. The unifying receiver being relatively small does not negatively effect the portability of the portable computer. For example, the unifying receiver might protrude from a connector on a portable computer by about 8 millimeters or less. Therefore, the unifying receiver may be plugged into a connector on a portable computer and "forgotten" as the protrusion of the unifying receiver does not negatively effect transport of the portable computer, and therefore does not need to be removed from the portable computer for transport. This might be referred to as a "plug and forget" concept of use. As referred to herein, a receiver may be configured to both transmit and receive wireless communications.

The unifying receiver is a universal serial bus (USB) receiver according to one embodiment of the present invention. That is, the unifying receiver is configured to communicate via USB protocols with the portable computer.

According to one embodiment of the present invention, the unifying receiver is configured such that it may be paired with up to six peripheral devices, such as human interface devices (HIDs), such as keyboard 130a, mouse 130b, keyboard 130c, mouse 130d, keypad 130e, and mouse 130f. The remainder of the specification discusses HIDs in particular, but reference to HIDs may equally apply to the broader category of peripheral devices. The USB receiver may have a machine readable memory and control logic (e.g., a microcontroller or the like) for remembering the pairing and for processing pairing or the like. According to alternative embodiments, the unifying receiver may be configured to pair to more than six HIDs. The HIDs may be located in a variety of locations so that the portable computer may be transported for use with the unifying receiver to the various locations where the HIDs are located. For example, a user may want to transport her portable computer for use at i) home where keyboard 130a and mouse 130b are located, ii) the office (e.g., job location) where keyboard 130c and mouse 130d are located, and iii) various transit locations where keypad 130e and mouse 130f may be transported in a briefcase, a backpack, etc. It will be understood that the specific HIDs at a given location may vary. For example, at home, a user might use a trackball instead of a mouse, or in transit, she might use a puck and the keypad, but not use the mouse. According to one embodiment, a number of user's may be have their HIDs paired with a single unifying receiver, for user on a home computer, office computer, etc. For example, a child might have a set of HIDs that are child sized or child application specific and are paired to a unifying receiver, a parent might have a set of HIDs that are standard sized or specific for applications of the parent and these HIDs are also paired to the unifying receiver. The foregoing describes a single use example. Those of skill in the art will recognize other use example of the present invention.

With traditional wireless technologies used for communication between HIDs and computers, a dedicated receiver (e.g., a dedicated USB receiver) often has a dedicated pairing to one mouse, to one keyboard, or to a set of one keyboard and one mouse. Pairing, as is well understood in the art, includes a process where an HID and a receiver are configured to recognize each other for wireless communication there between. Dedicated pairing generally refers to a process where one, or possibly two, HIDs and a receiver recognize each other for wireless communication but will not recognize other HIDs or receivers for wireless communications.

If a user wants to connect a number of HIDs, or a mix of HIDs from different sets of HIDs, the user generally would keeps several dedicated receivers attached to the connectors (e.g., USB ports) on her computer. As the number of connectors available on portable computers is limited, and as the number of HIDs a user uses grows, these dedicated receivers tend to fill up most or all of the connectors. Embodiments of the present invention, which include the unifying receiver, were developed in part to support up to six wireless HIDs with one single USB receiver and solve problems with connectors on a portable computer from filling up. Typically, if all of the connectors on a portable computer fill up, and new HIDs are to be used with the computer, this requires the various dedicated receivers be disconnected and reconnected as various HIDs are used by the user.

Embodiments of the present invention provide that a user may build custom wireless networks (e.g., star networks) by pairing her wireless HIDs to the unifying receiver. Typically, if a wireless device (e.g., a Bluetooth headset) is paired to a receiver (e.g., a mobile telephone with Bluetooth capability), a user action is usually required on the device side to "unlock" the device and allow it to pair with the receiver. Many wireless devices include a push button dedicated to pairing authorization and pairing activation. Many wireless devices also include an off/on switch to save battery power when the device is not used for long periods of time or when the wireless device is packed in a bag for a long travel.

Figure 2:
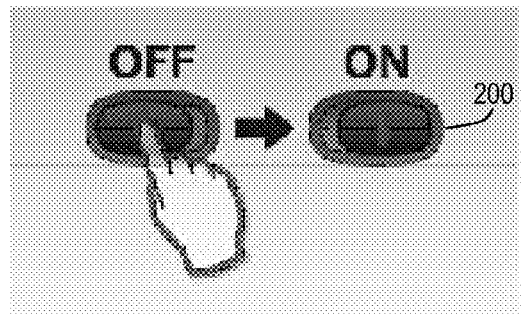
FIG. 2 is a simplified schematic of a slider switch that may be disposed on an HID according to one embodiment of the present invention.

FIG. 2 is a simplified schematic of a slider switch 200 that may be disposed on an HID according to one embodiment of the present invention. The slider switch is configured to power on and power off the HID, and open a select period of time (e.g., less than one second) in which the HID may be authorized to begin pairing to the unifying receiver. That is, to activate a pairing mode on an HID, the slider switch is moved from "off" to "on", or if the HID is already on, then slider switch is moved from "on" to "off" to "on". A pairing mode is a mode of operation of the unifying receiver and/or the HID in which the unifying receiver and the HID may pair with one another. If the unifying receiver and the HID are paired, the unifying receiver and the HID will recognize one another for communication there between for control of the laptop computer.

As two different functions—powering and pairing—are initiated by a single slider switch being switched from "off" to "on", timing available for pairing is chosen to avoid accidental pairing when an HID is turned on. Therefore, when the slider switch is set to "on", the HID first tries, for about one second, to reconnect to the unifying receiver that HID was last connected to. If the HID is able to reconnect to this unifying receiver, this indicates that unifying receiver is powered on and is close by. In this case, the HID does not enter pairing mode because it assumes that the user does not want to establish a new pairing.

If the reconnection fails, this indicates that the last unifying receiver that the HID was paired with is not powered on, or is not close by. In this case, the HID enters pairing mode to establish a new pairing with a different unifying receiver. The HID may enter pairing mode for about 500 milliseconds or less. If a unifying receiver in pairing mode is identified during this time window by the HID, the HID pairs to the unifying receiver and exits pairing mode. The new pairing of the HID overwrites any previous pairing, meaning that an HID may only be paired to one receiver at a time. The HID may include a communication device for communication with the unifying receiver. The communication device may include a processor and a receiver, which is configured to be controlled by the processor for communication with the unifying receiver. The processor and the receiver may be configured to operate alone or together to detect the slider switch being switched from off to on to and to perform the reconnection and pairing steps discussed above.

If an HID is to be paired to a wireless receiver, a user action is also typically required on the receiver to authorize the receiver to pair to the HID. Some receivers, based on other radio technologies (e.g., 27 megahertz technologies, proprietary 2.4 gigahertz technologies, etc.), include a push button that is pressed to authorize pairing. Due to the relatively small form factor of the unifying receiver, it would be difficult for the user to reach a connect button if the unifying receiver is plugged in a connector on the portable computer and is between two USB cables, memory sticks, or the like. Therefore, pairing activation of the unifying receiver is controlled by a software application, which is stored on a computer readable medium of the portable computer and is executed by the processor of the portable computer. For convenience, the software application is referred to herein as the "connect utility" software. The connect utility software may be included in the enumeration software.

The connect utility software is configured to provide a user interface (e.g., a graphical user interface) to i) prompt a user to authorize pairing for the unifying receiver with an HID, or ii) to automatically place the unifying receiver in pairing mode at the time the connect utility software is started. That is, the connect utility software may be configured to direct the portable computer's processor to send a command to the unifying receiver to enter pairing mode. Generally, the unifying receiver enters pairing mode before the HID enters pairing mode. Once authorized for pairing, the unifying receiver may stay authorized for a period of time, such as 30-60 seconds so that the user has time to authorize pairing for the HID. That is, the user will be given sufficient time to read any screen messages presented to the user by the connect utility software, and thereafter will have sufficient time to locate the slider switch, and slide the slider switch from "off" to "on". If an HID in pairing mode is identified by the unifying receiver, the unifying receivers pairs with the HID and then exits pairing mode.

Figure 3A:
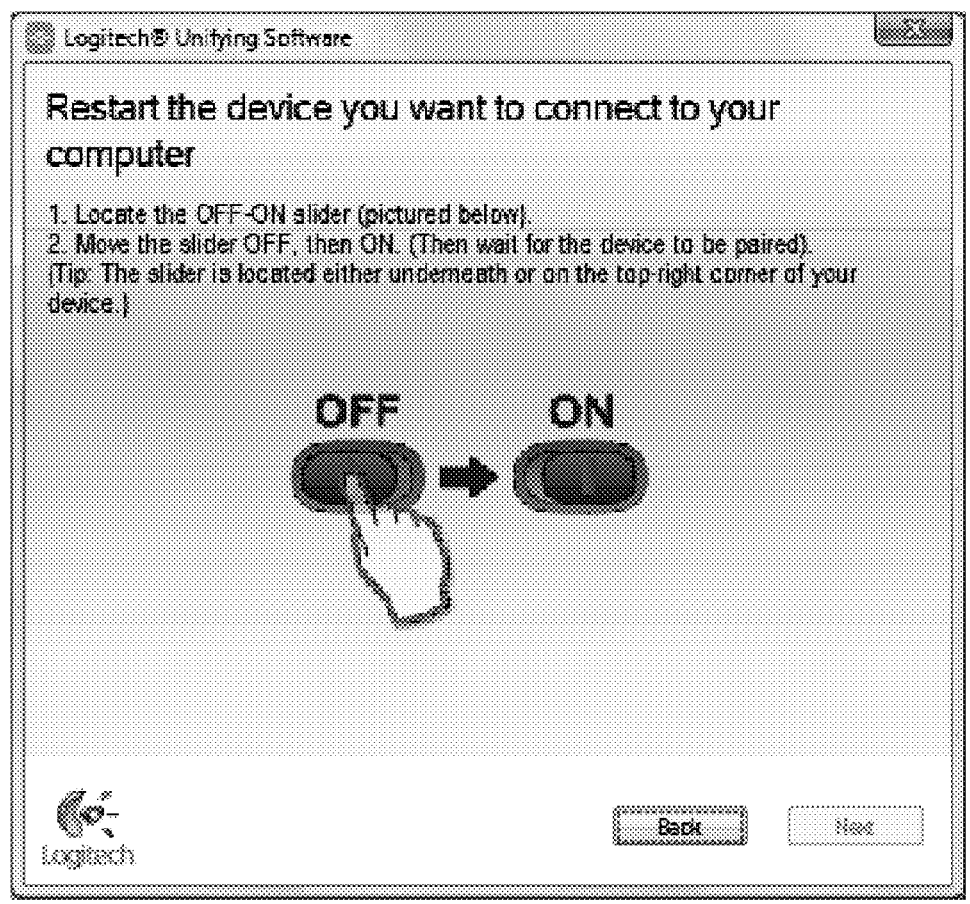
FIG. 3A is a simplified GUI (graphical user interface), which may be displayed on the portable computer under control of the connect utility software.
Figure 3B:
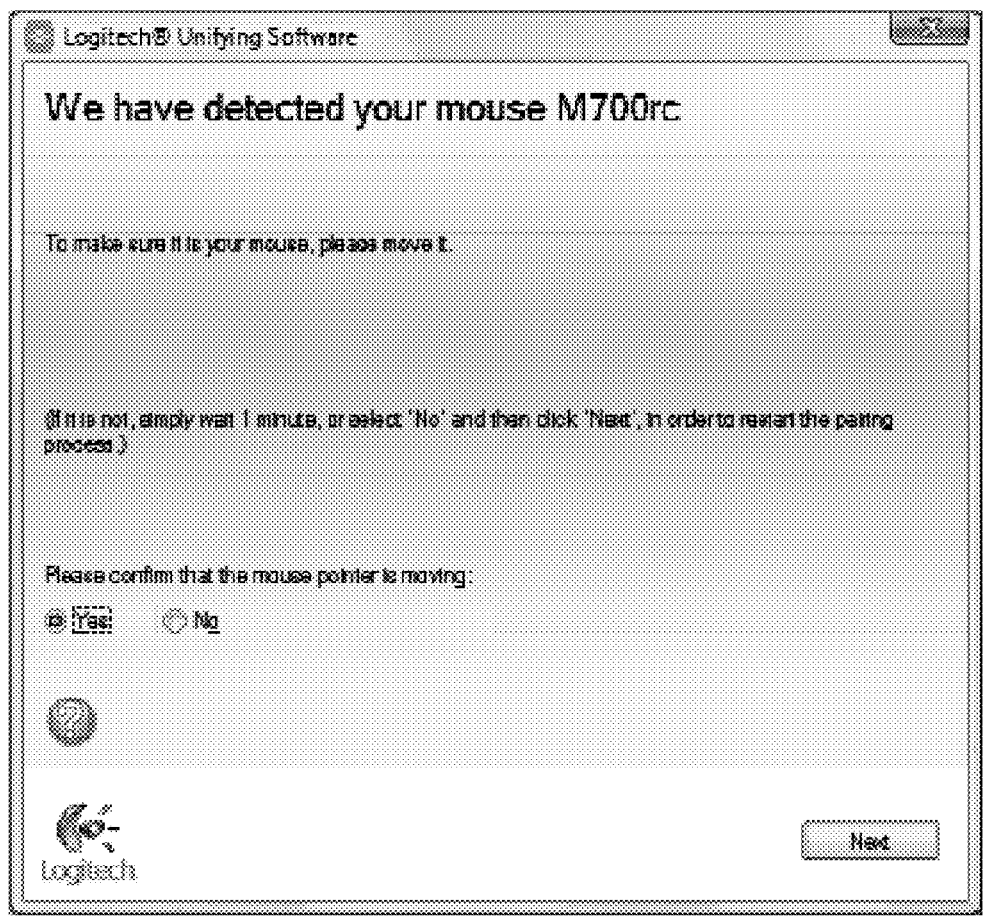
FIG. 3B is a simplified GUI, which may be displayed on the portable computer under control of the connect utility software to inform the user that the user's HID has been detected by the unifying receiver.
Figure 3C:
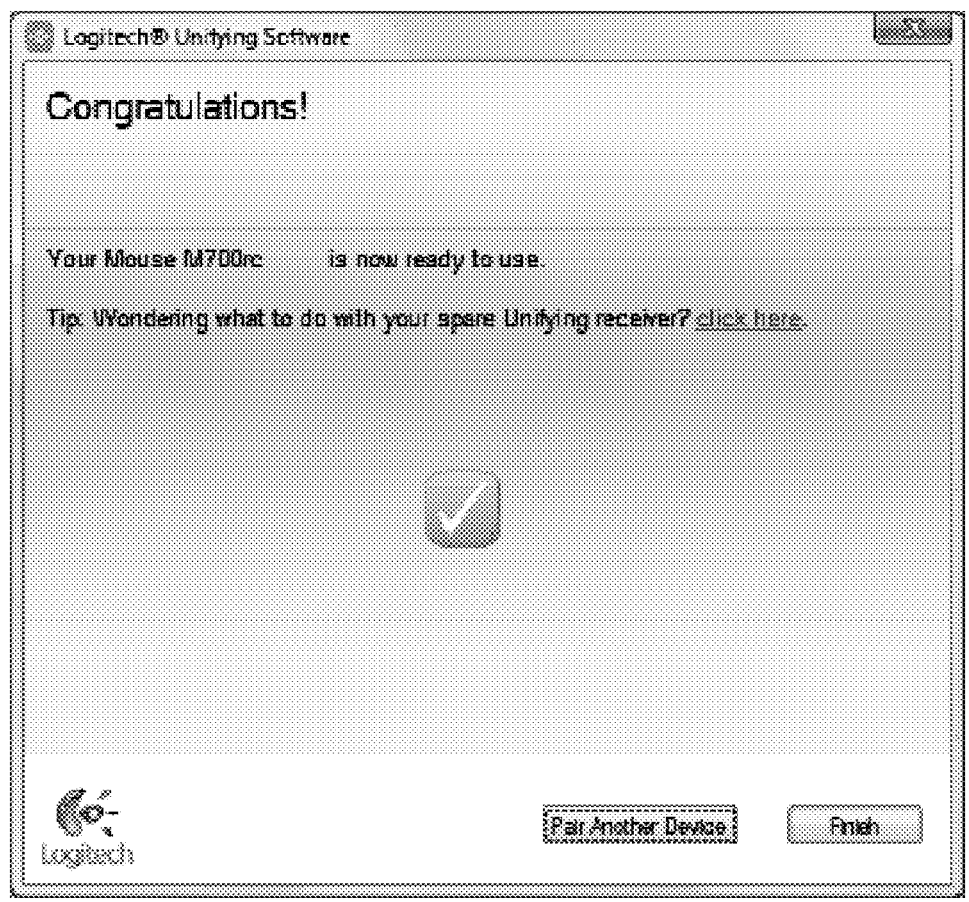
FIG. 3C is a simplified GUI, which may be displayed on the portable computer under control of the connect utility software to inform the user that pairing was successful.

According to one embodiment, the connect utility software is configured to display a GUI to instruct the user to slide the slider switch on the HID from "off" to "on" to authorize pairing between the unifying receiver and the HID. FIG. 3A is a simplified GUI, which may be displayed on the portable computer under control of the connect utility software. The GUI is configured to direct the user to slide the slider switch from "off" to "on." FIG. 3B is a simplified GUI, which may be displayed on the portable computer under control of the connect utility software to inform the user that the user's HID (e.g., mouse M700rc) has been detected by the unifying receiver. After both the unifying receiver and the HID are authorized to pair (i.e., both are in pairing mode) with one another, these devices may perform the pairing process. The steps for performing a pairing process are well known by those of skill in the art and will not be described herein. FIG. 3C is a simplified GUI, which may be displayed on the portable computer under control of the connect utility software to inform the user that pairing was successful. An alternative GUI may be displayed if pairing is not successful.

Figure 4A:
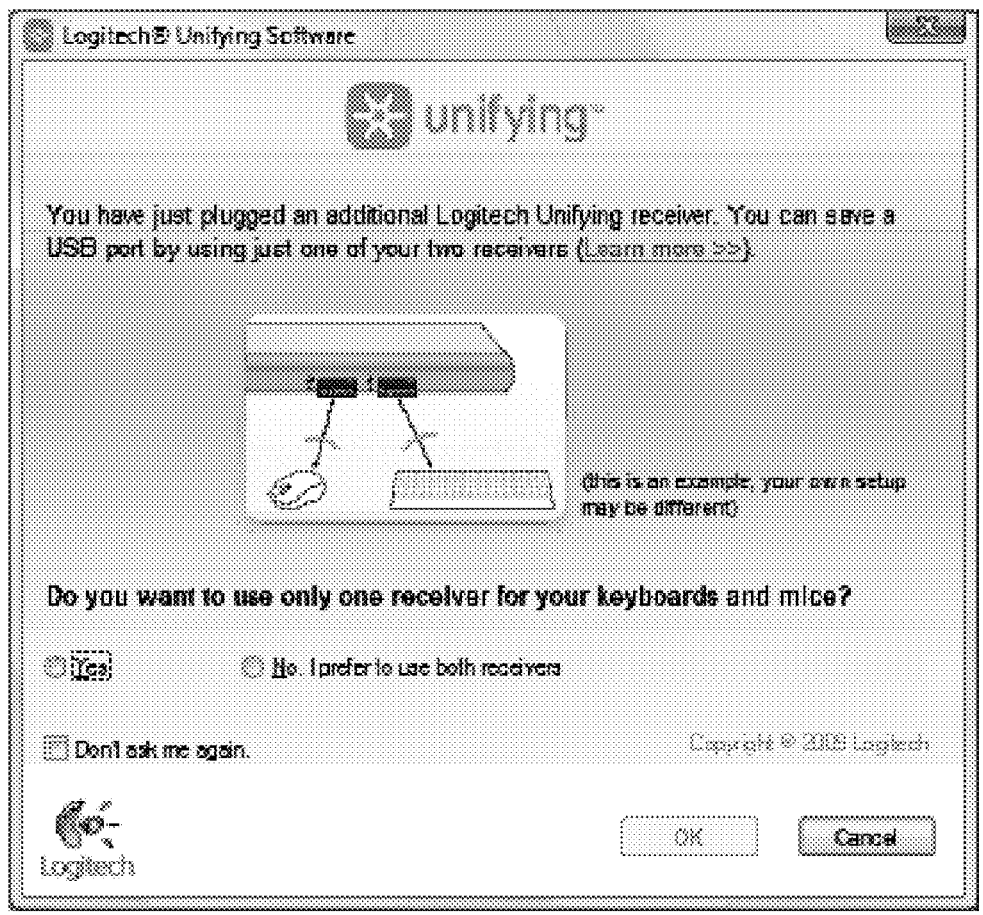
FIG. 4A is GUI for the connect utility software to inform the user that two unifying receivers are plugged into the USB ports.
Figure 4B:
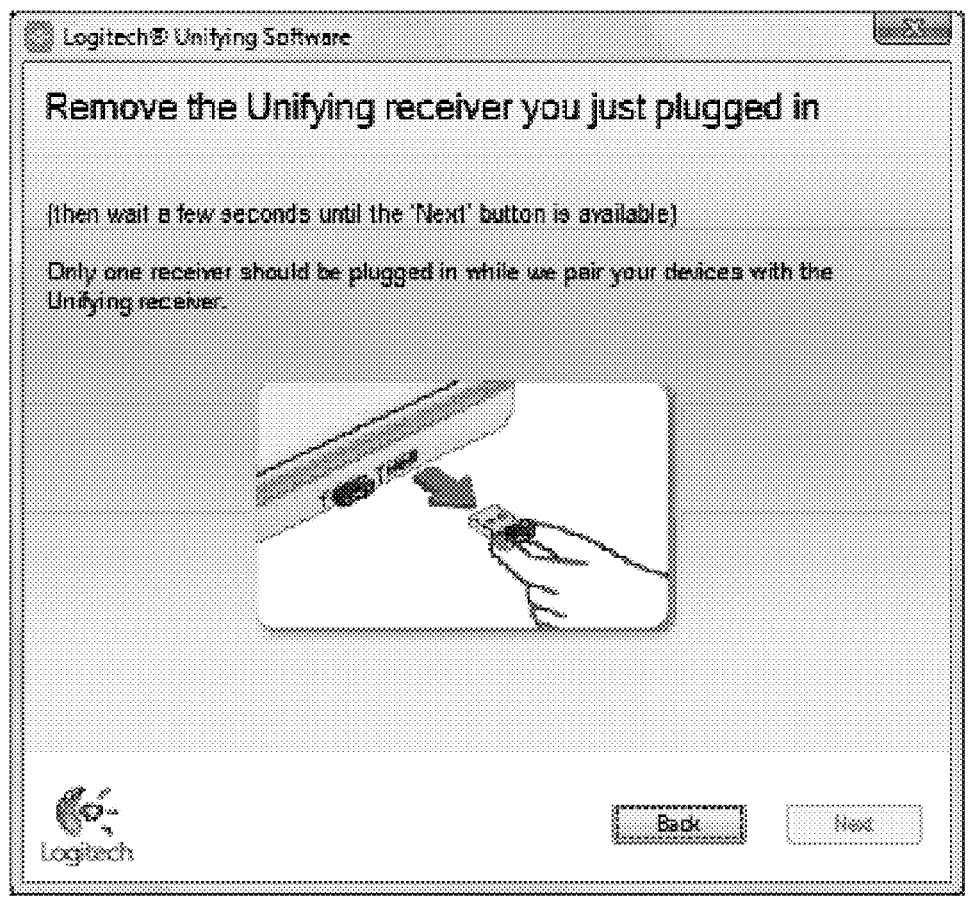
FIG. 4B is a GUI which directs the user to remove one of the unifying receivers.
Figure 4C:
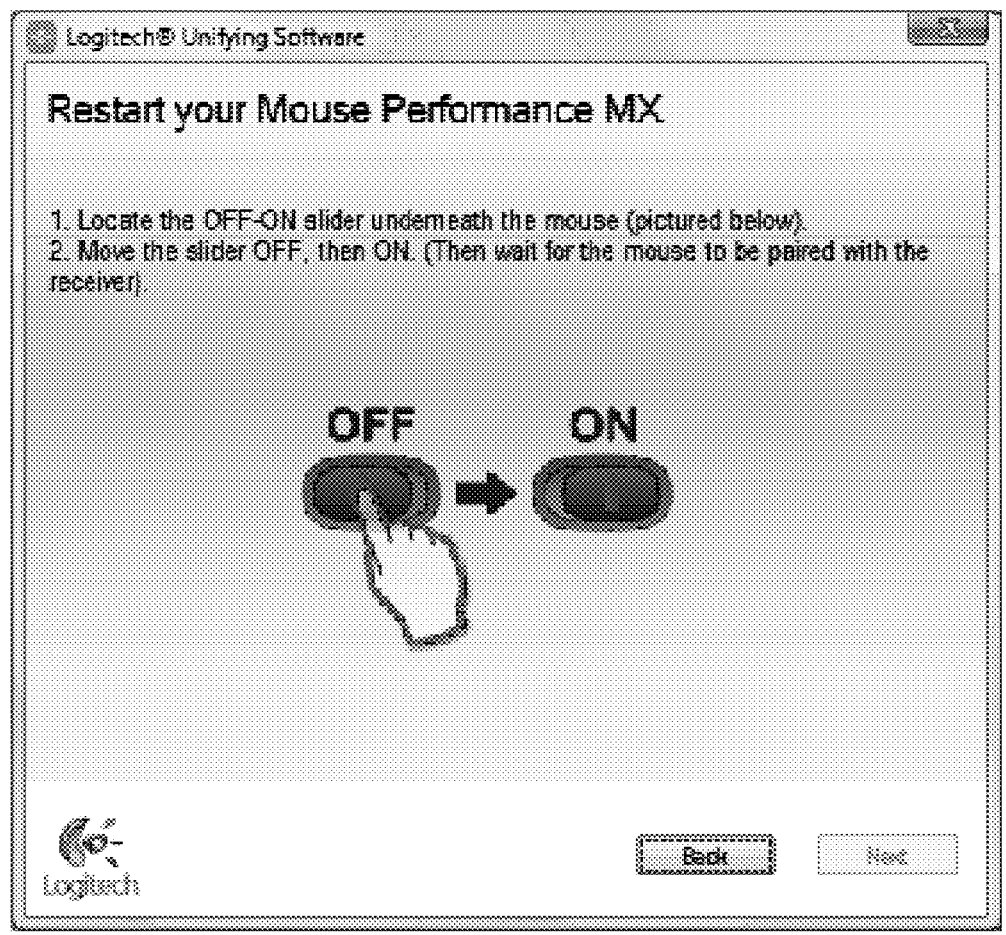
FIG. 4C is GUI configured to direct the user to locate the slider switch, and switch the slider switch from off to on for the HID to accept pairing.
Figure 4D:
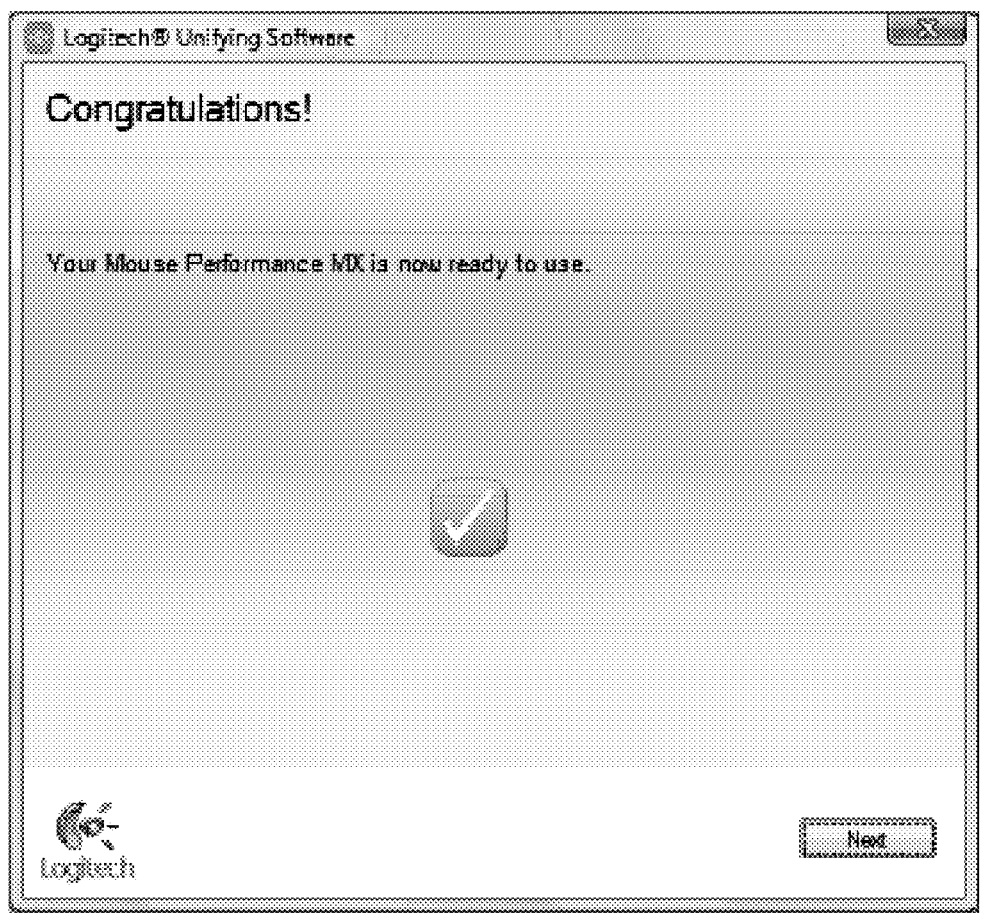
FIG. 4D is a GUI configured to inform the user that pairing was successful.
Figure 4E:
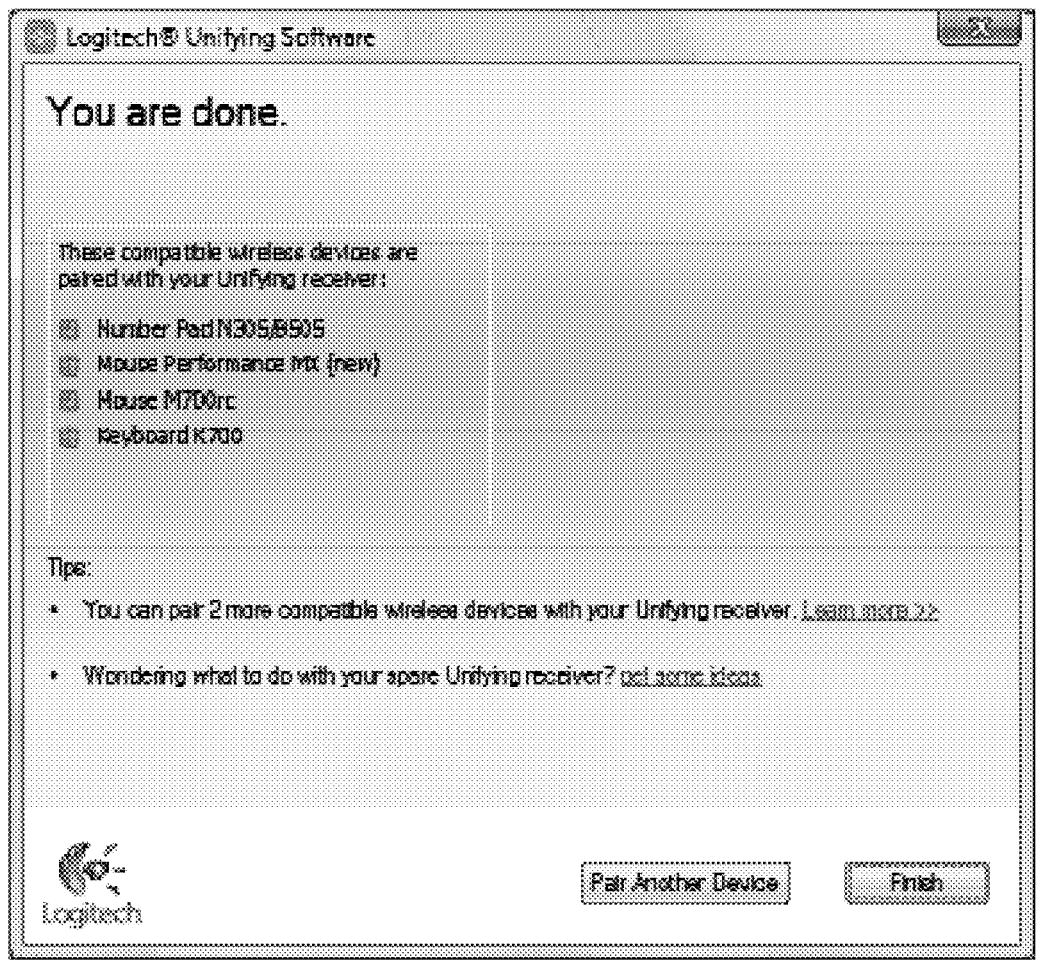
FIG. 4E is a GUI to inform the user of all of the HIDs that are paired to the unifying receiver.

According to one embodiment, the connect utility software is configured to detect whether multiple unifying receivers are plugged into the USB ports of the portable computer. If multiple unifying receivers are plugged into the USB ports, the connect utility software may be configured to guide the user through a process of pairing, so that both sets of HIDs for both unifying receivers are paired to one of the unifying receivers. For example, the connect utility software may inform the user via a GUI (e.g., FIG. 4A) that two unifying receivers are plugged into the USB ports, and may ask the user for a computer input to indicate that the user would like the connect utility software to have both set of HIDs for the two unifying receivers paired with just one of the unifying receivers. If the user selects the option to have both sets of HIDs paired to one unifying receiver, the connect utility software is configured to control the portable computer to display GUIs, for example, to guide the user through this pairing process. For example, to have both sets of HIDs paired to one of the unifying receivers, the connect utility software may direct the user to remove one of the unifying receivers from the USB port to which it is connected. See, for example, the GUI shown in FIG. 4B in which the GUI directs the user to remove one of the unifying receivers. The connect utility software may then direct the processor to place the remaining connected unifying receiver to accept pairing. The connect utility software may be configured to direct the user (e.g., via a GUI, see FIG. 4C) to locate the set of slider switches for the set of HIDs, and switch the set of slider switch from off to on for the set of HIDs to accept pairing. A subsequent GUI, shown in FIG. 4D may inform the user that pairing was successful. As a result of the pairing, two set of HIDs are paired to one unifying receiver. The connect utility software may be configured to have another GUI displayed on the portable computer informing the user of all of the HIDs in the two sets of HIDs are paired to the unifying receiver. See, for example, FIG. 4E.

Figure 5:
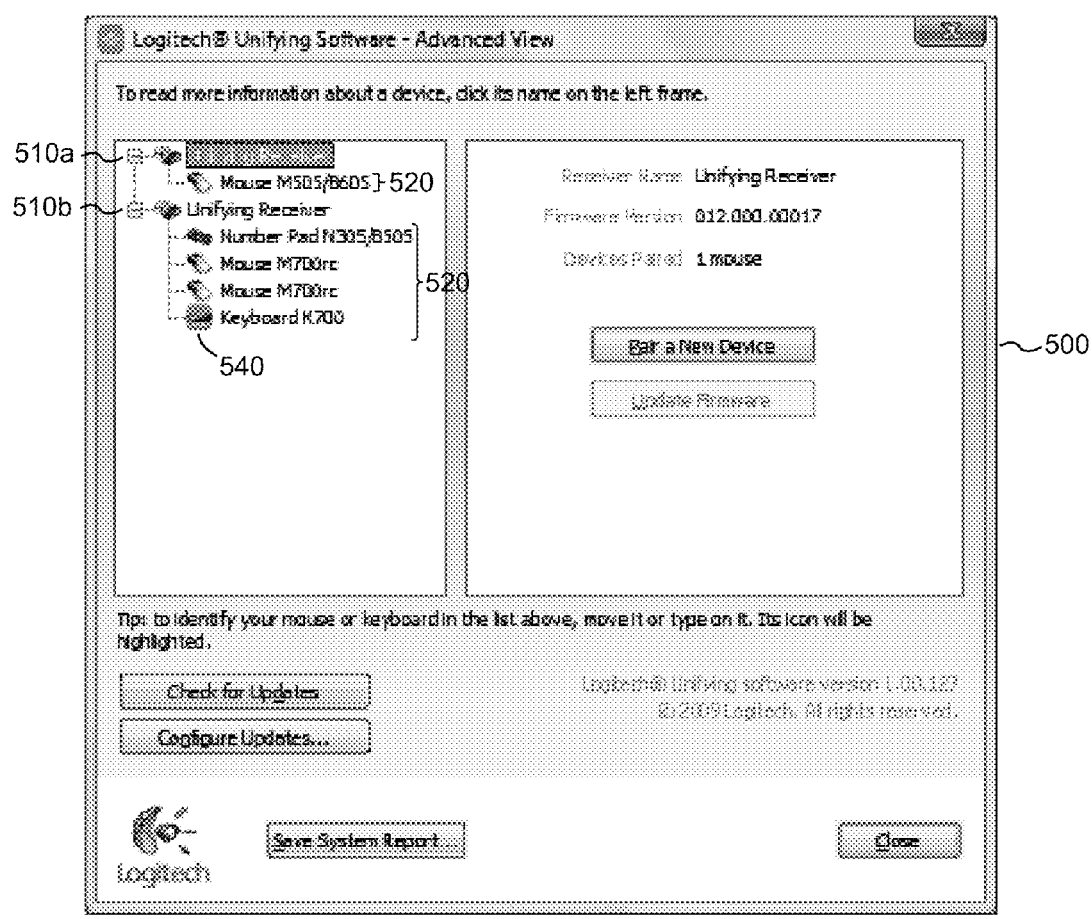
FIG. 5 is a simplified schematic of a dashboard GUI that includes a set of unifying receiver identifiers for a set of unifying receivers coupled to the portable computer.

According to one embodiment of the present invention, the connect utility software is configure to provide a "dashboard" utility, which is configured to provide, via the portable computer, a number of user controllable options for managing a user's HIDs. The connect utility software may be configured to present the user controllable options in a dashboard GUI. FIG. 5 is a simplified schematic of a dashboard GUI 500 for the dashboard utility according to one embodiment of the present invention. Dashboard GUI 500 includes a set of unifying receiver identifiers 510 for a set of unifying receivers coupled to the portable computer. A "set" as used herein includes one or more elements. For example, a set of unifying receivers includes one or more unifying receivers. According to the example being considered, dashboard GUI 500 shown in FIG. 5, identifies that two unifying receivers 510a and 510b are coupled to the portable computers USB ports.

Dashboard GUI 500 also includes sets of HID identifiers 520 for each set of HIDs paired to the set of unifying receivers coupled to the portable computer. According to the example dashboard GUI 500, a mouse having HID identifier M505/B605 is paired to unifying receiver 510a. According to the example dashboard GUI 500, a number pad having HID identifier N305/B505, a first mouse having HID identifier M700rc, a second mouse having HID identifier M700rc, and a keyboard having HID identifier K700 are paired to unifying receiver 510b.

According to one embodiment, the dashboard utility is configured to provide user selectable options for pairing HIDs to a given unifying receiver, for example, if two unifying receivers are detected as being coupled to the portable computer. Such pairing is described in detail above. The dashboard utility may also be configured to provide a user selectable option for un-pairing an HID from a unifying receiver. The dashboard utility may also be configured to provide user selectable options for loading updated firmware from a website to the user's HIDs and unifying receivers. Each of the user selectable options may be presented on dashboard GUI 500 as screen buttons, drop down menus, floating menus, or the like.

As described briefly above, the dashboard utility is configured to present (e.g., on dashboard GUI 500) HID identifiers for the HIDs paired with the unifying receivers, which are coupled to the portable computer. According to one embodiment, the HID identifiers presented by the dashboard utility are the same HID identifiers displayed (e.g., printed) on the cases of the HIDs. For example, the HID identifier M505 or B605 for the mouse paired to unifying receiver 510a, is printed on the case of the mouse, such as on the bottom of the mouse. Thereby, a user may relatively quickly identify which of her HIDs are paired to the unifying receivers. According to one embodiment, each HID is configured to store its HID identifier. During or after pairing each HID is configured to provide its HID identifier to the connect software utility operating on the portable computer. Providing HID identifiers from HIDs to the connect software utility, eliminates the need for look up tables to be provided for HID identifiers in the connect software utility or other utility. Further, providing HID identifiers in the HIDs, allows manufacturers to release new HIDs, which can identify their HID identifiers to the portable computer, and thereby new HID identifier lists do not need to be created and distributed to users at the time new HIDs are available for sale.

According to another embodiment of the present invention, the dashboard utility is configured to provide a "use identifier" for an HID that is currently being operated by a user. A use identifier 540 is shown in GUI 500 to indicate to a user which of the user's HIDs is currently in use. The use identifier may be displayed after a user presses a key, for example, on a keyboard paired to a unifying receiver, moves a mouse, presses a keypad button, etc. so that an input is generated from the HID to the portable computer. The display of a use identifier provides particular advantage in that, if a user owns two identical HIDs having the same HID identifier, the user can operate one of the HIDs, see the use identifier in GUI 500, and know which HID corresponds to an HID identifier displayed in GUI 500. The display of the use identifier provides additional utility if two identical HIDs are paired to different unifying receivers, which are used with the portable computer.

As discussed above, up to six HIDs may be paired to a unifying receiver according to one embodiment of the present invention. According to alternative embodiments, more or fewer HIDs may be paired to the unifying receiver. That is, six HIDs may be exposed to the operating system (OS) of the portable computer for use therewith. One embodiment of the present invention includes enumerator software 110c (see FIG. 1B where 110c designates the computer code for all embodiments of the present invention) configured to be stored on the computer readable medium of the portable computer and control operations of the processor of the portable computer so that a number (e.g., up to 6) HIDs may be exposed to the OS, and so that all of the control functions of the up to 6 HIDs, for example, may be used with the portable computer. Control functions include the functions that the HIDs are configured to perform to control various aspects of the portable computer, such as controlling a cursor by moving a mouse, "pressing" a screen button by pressing a mouse key, entering a string of letters, numbers, etc. by pressing the keys of a keyboard, and the like. The enumerator software sits between the OS of the portable computer and the unifying receiver. That is, the enumerator software intercepts commands issued by the unifying receivers for the OS, and relays the commands appropriately to the OS so that all of the control functions of the HIDs may be used with the portable computer. The enumerator software also intercepts commands issued by the OS for the unifying receiver and relays these commands appropriately to the unifying receiver.

Figure 6:
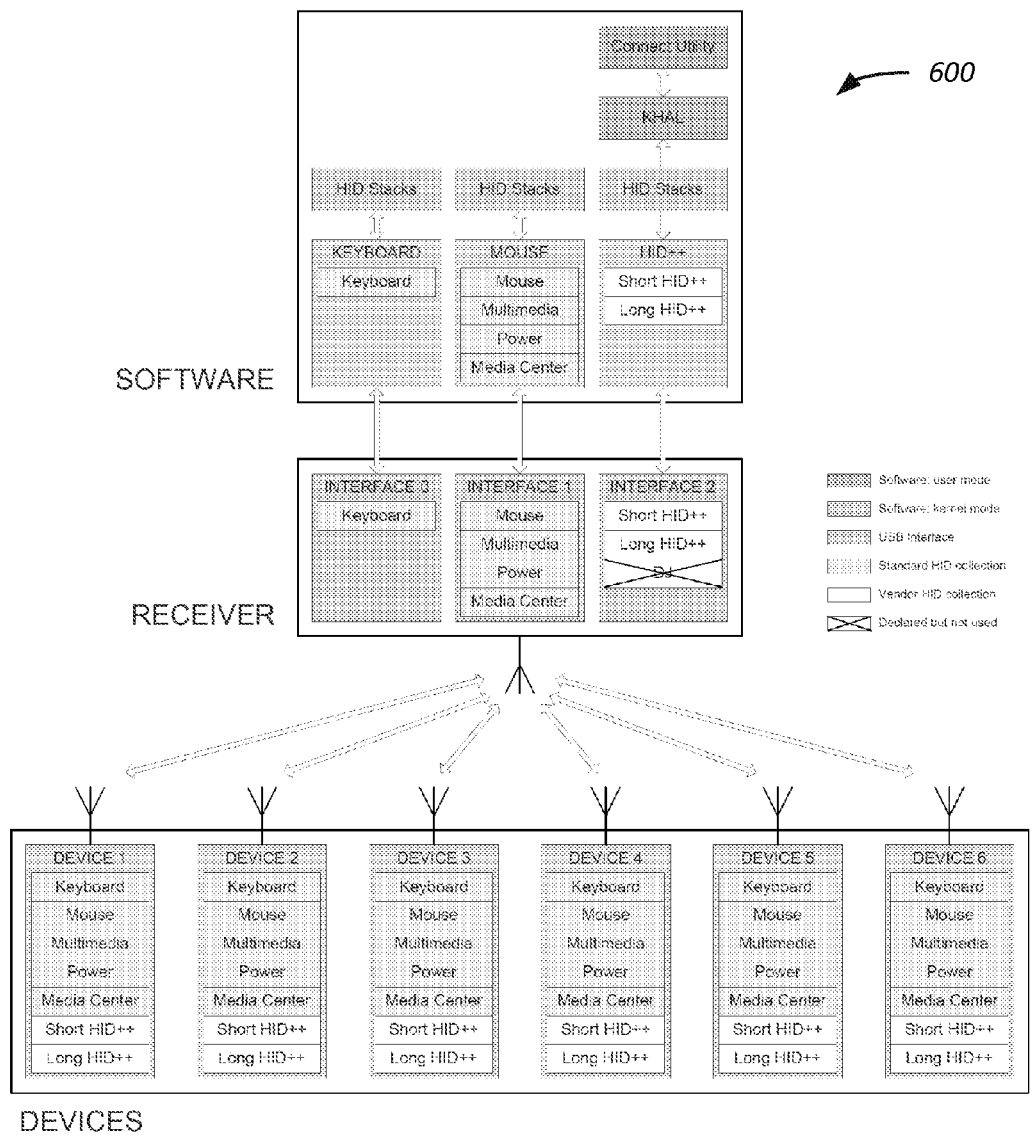
FIG. 6 is a simplified operational diagram of the operating software of the portable computer in operation with the unifying receiver and a set of HIDs.

To aid in understanding the operation method of the enumerator software on the portable computer, an operation method of the portable computer without the enumerator software will first be described. FIG. 6 is a simplified operational diagram of the operating software 600 of the portable computer in operation with the unifying receiver 120 and a set of HIDs 130. If the unifying receiver is used without the enumerator software, the unifying receiver declares to the OS the HID collections required to support one keyboard and one mouse (i.e., not more than one keyboard and not more than one mouse). Because each HID collection is declared only one time, similar reports from different HIDs are merged and forwarded to the OS using the same collection. Therefore, similar reports from different HIDs of the same type (e.g., two keyboards) cannot be differentiated by the software. Therefore, there is no possibility for the OS to apply different settings to different HIDs of the same type. For example, if two mice are connected to the same receiver, it is not possible to specify different acceleration curves for each mouse. This is especially troublesome if one of the two "mice" is in reality a touchpad. It is particularly noted that HID collections, HID reports, and the like are well understood by those of skill in the art and will not be described herein.

Figure 7:
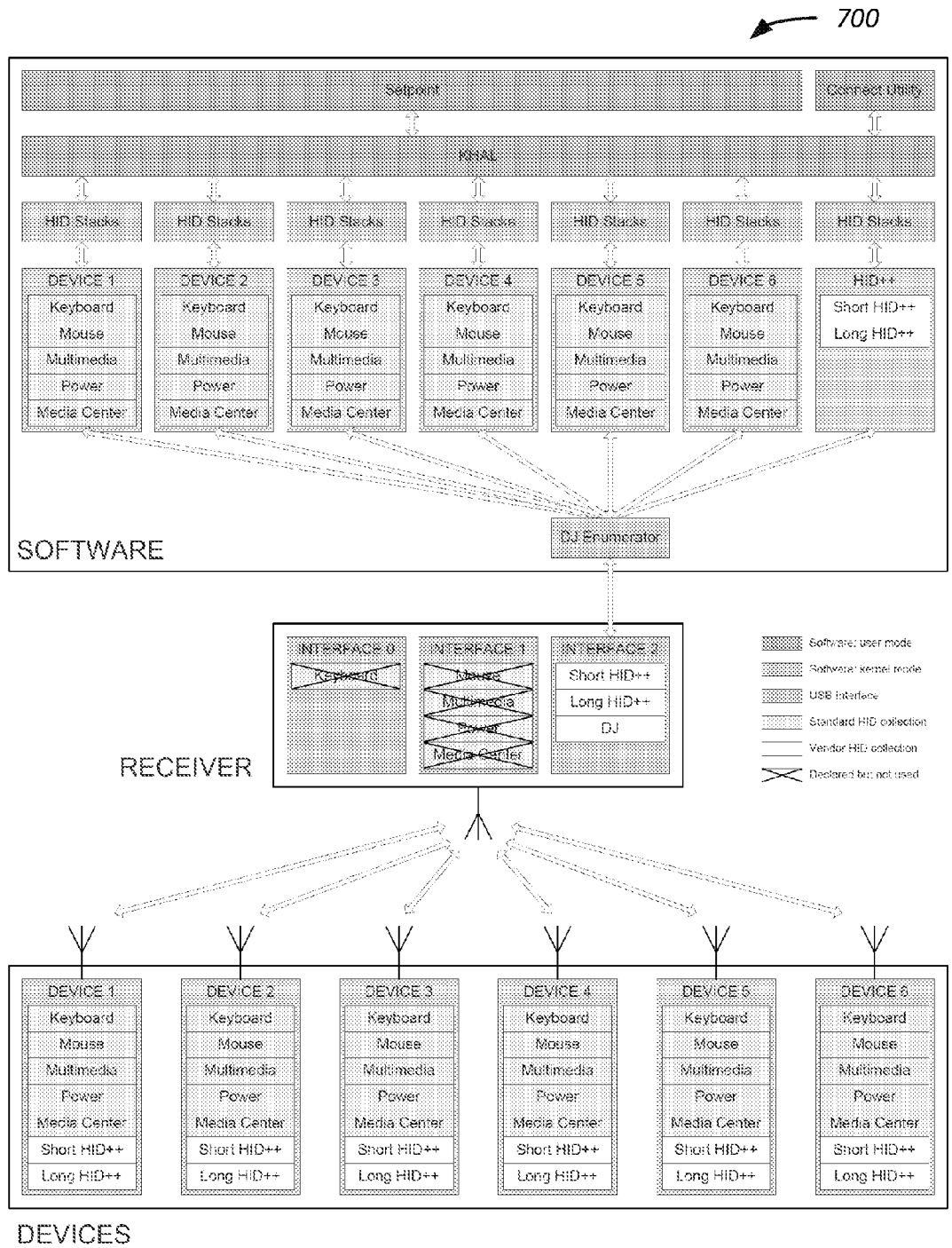
FIG. 7 is a simplified operational diagram of the OS of the portable computer in operations with the enumerator software, the unifying receiver, and a set of HIDs.

FIG. 7 is a simplified operational diagram of OS 600 of the portable computer in operations with enumerator software 700, unifying receiver 120, and a set of HIDs 130. According to one embodiment, the enumerator software is configured to permit the OS to process reports from each HID individually, while limiting (e g, minimizing) the number of collections that are exposed to the OS. Without the enumerator software, the unifying receiver would substantially constantly have to expose more than 30 collections to the OS, even when the only HID in use with the unifying receiver is, for example, a simple mouse. This relatively large amount of collections would require a very long enumeration time (which includes the time to install software to support the HIDs) and would create a confusing list of HIDs in the Windows Device Manager, and could possibly lead to system stability issues.

When the enumerator software is launched for execution on the portable computer, it is configured to collect a list of all HIDs that are currently paired to the receiver, and collect a sub-list of all report types that are supported by each HID. Based on the collected list of HIDs and the sub-list of all report types, the enumerator software is configured to declare the correct number of HIDs, with the appropriate set of HID collections, to the OS. Reporting the correct number of HIDs, and the appropriate set of HID collections to the OS is generally referred to as an enumeration phase (or an enumeration operation) of execution of the enumeration software.

After the enumerator software completes the enumeration phase, the enumerator software sends a "switch" command to the unifying receiver. After the unifying receiver receives the switch command, the unifying receiver stops posting standard HID reports on USB interfaces 0 and 1. Instead, the unifying receiver is configured to tag all incoming RF reports from the HIDs and forward the tagged reports to the OS using the enumerator collection 710 (also labeled with the letters DJ) on USB Interface 2. Various tags that the unifying receiver uses to tag the incoming RF reports are described below. The enumerator software is configured to use the tags in the received reports from the unifying receiver to format the reports and route the reports to the appropriate HID drivers operating on the portable computer. Device drivers for HIDs are well understood by those of skill in the art and will not be described in detail herein except to note that a specific device driver for a specific HID provides that the specific HID may be permitted to use all of its control functions with the portable computer. As the enumerator software routes the received reports, the appropriate HID drivers for each HID may use all of its control functions with the portable computer. The routing of the received reports for the respective HIDs to the HIDs' drivers is indicated in FIG. 7 by arrows 730 from the enumerator software to the device stacks 740*a*-740*f*.

Figure 8:
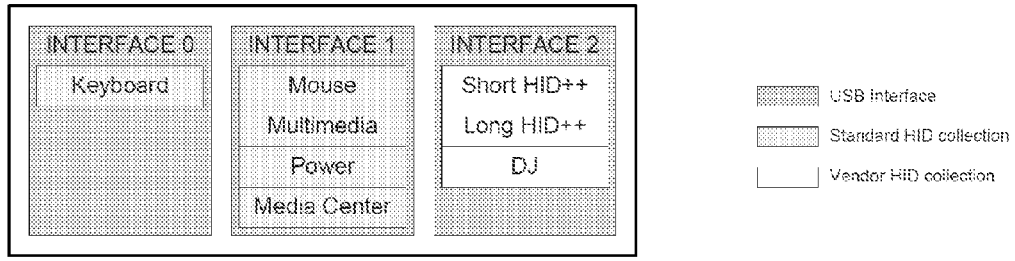
FIG. 8 is a simplified diagram of the USB interface of the unifying receiver.

The USB interfaces are briefly described. FIG. 8 is a simplified diagram of the USB interface of the unifying receiver. The functionality of the enumerator software is managed in part via a USB interface 2, which is unique from USB interfaces 0 and 1. This organization of the USB interfaces enables the enumerator software to operate as a separate driver on the portable computer. The USB interface 2 (label 750 in FIG. 7), sometimes also referred to herein as the enumerator interface, includes the following HID collections and reports:

| | | |
|---|---|---|
| Short HID++ collection: | vendor page 1: usage 1 | |
| Short HID++ report | vendor page 1: usage 1, report id 0x10 | (7 bytes) |
| Long HID++ collection: | vendor page 1: usage 2 | |
| Long HID++ report | vendor page 1: usage 2, report id 0x11 | (20 bytes) |
| Enumerator collection: | vendor page 1: usage 4 | |
| Short Enumerator report | vendor page 1: usage 0x41, report id 0x20 | (15 bytes) |
| Long Enumerator report | vendor page 1: usage 0x42, report id 0x21 | (32 bytes) |

The enumerator collection is briefly described. The enumerator collection is a generic communication channel between the enumerator software and the unifying receiver. USB does not support variable report sizes. Therefore, two enumerator reports are defined that have different sizes. A short enumerator report is defined to transport the standard HID reports between the HIDs and the enumerator software, as well as the commands and notifications between the unifying receiver and the enumerator software. The long enumerator report is defined to transport longer non-standard HID reports between the HIDs and the enumerator software.

| 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|
| Report Id: 0x20 | Device Index | Report Type | | | | | | Report Payload (12 bytes) | | | | | | |

| 1 | 2 | 3 | 4 | 5 | ... | 21 | 22 | 23 | 24 | ... | 31 | 32 |
|---|---|---|---|---|---|---|---|---|---|---|---|---|
| Report Id: 0x21 | Device Index | Report Type | | | | | Report Payload (29 bytes) | | | | | |

The report id, shown above, defines the report length according to the USB HID report descriptor. The HID index indicates the origin of a packet in upstream transfers (HID to unifying receiver to enumerator software) and the destination of a packet in downstream transfers (enumerator software to unifying receiver):

| | |
|---|---|
| 0x01 to 0x06: | wireless device |
| 0xff: | receiver |

The report type identifies the type of payload that follows the identifiers. 256 possible report types are organized in three classes:

| | |
|---|---|
| 0x00 to 0x3f: | HID reports |
| 0x40 to 0x7f: | enumerator notifications |
| 0x80 to 0xff: | enumerator commands |

If the enumerator software is active on the portable computer (e.g., an enumerator mode of operation is running on the portable computer), the unifying receiver is configured to add a header to all incoming reports from HIDs paired to the unifying receiver and forward the reports to the executing enumerator software via the USB interface 2 (enumerator interface). The enumerator header includes a report id followed by a device index. The report type included in the enumerator reports matches the RF report type that tags all reports transmitted over the radio signal.

HID Reports:

| | |
|---|---|
| Report Type = 0x01: | keyboard reports |
| Report Type = 0x02: | mouse reports |
| Report Type = 0x03: | consumer controls |
| Report Type = 0x04: | system controls |

According to one embodiment, enumerator commands are used by the enumerator software to control the operation of the unifying receiver. The enumerator commands further enable the enumerator software to retrieve the list of paired HIDs and the sub-list of collections supported by each HID. The enumerator commands also enable the enumerator software to individually switch each HID from a default HID mode to the enumerator mode.

Enumerator Commands:

| | |
|---|---|
| Report Type = 0x80: | switch to enumerator mode |
| Report Type = 0x81: | get list of paired devices |

Enumerator notifications enable the unifying receiver to communicate i) pairing events and un-pairing events of the HIDs to the enumerator software, ii) connection status of the HIDs to the enumerator software, and iii) error conditions to the enumerator software.

Enumerator Notifications:

| | |
|---|---|
| Report Type = 0x40: | a device was unpaired |
| Report Type = 0x41: | a device was paired |
| Report Type = 0x42: | connection status changed |
| Report Type = 0x7F: | error |

Bandwidth allocation and use of the HIDs in combination with the unifying receivers are described. Prior to describing specific embodiment of bandwidth allocation, a short background description is provided for RF channel use for HIDs and receivers. In general, a receiver (e.g., a USB receiver) selects a free RF channel to communicate on, and continues to communicate on the RF channel with the HIDs paired to the unifying receiver. In optimal conditions, an HID that has data to transmit to the receiver can perform this transfer relatively quickly, if the HID knows the receiver is listening of this free RF channel. In less than optimal conditions, the receiver may have to choose a different RF channel if an external source of perturbation (such as a WLAN) becomes active, or if a change in the desktop configuration where the HIDs and receiver are used introduces a strong attenuation of the RF channel. If a different RF channel is selected by the receiver, an HID that has data to transmit to the receiver may have to search for the receiver on all possible RF channels before it can successfully transmit data to the receiver and thereby to the portable computer. Searching for a channel that the receiver is listening on typically result in a latency between operation of the HID and a response to the operation on the portable computer. This latency may be perceived by the user and may be perceived as an annoyance. To avoid such latencies, HIDs that have no more data to transmit continue to transmit a "keep alive" beacon signal (also referred to sometimes a as keep alive report) at regular intervals to follow the RF channel the receiver is listening to, and to minimize latencies the next time data needs to be transmitted to the receiver. The keep alive beacon signal is typically a report with an empty payload (i.e., no command for the portable computer to act on). The is generally referred to as an active connection to an RF where an HID substantially continuously sends data to the receiver, or where the HID sends keep alive beacon signal to the receiver.

Supporting up to 6 HIDs with a single unifying receiver is challenging in terms of bandwidth allocation. Although the theoretical bandwidth of a 2.4 GHz radio link is relatively high, a practical system allocates a large amount of bandwidth for "overhead" management to provide for the co-use of multiple HIDs on a given radio channel and to provide for immunity of the system to various types of external perturbations that negatively affect use of the RF channel. The inventors of the embodiments of the present invention have determined that the link quality for an RF channel is generally difficult to guarantee if more than three connections for three HIDs are active at the same time. To overcome the bandwidth limitation, a method has been developed according to an embodiment of the present invention to put inactive connections for inactive HIDs on-hold when the maximum of three active connections for three active HIDs has been reached. That is, according to various embodiments of the present invention, up to three active connections for three HIDs are maintained by the unification receiver.

Because an HID whose connection is on-hold cannot "follow" the active RF channel that the receiver is listening to, latency may be introduced if the unifying receiver has moved to another RF channel when the connection for the on-hold HID needs to be reactivated. To keep this latency substantially to a minimum (such as a latency at or below a length of time that is perceivable by a human user), embodiments of the present invention provide a relatively fast reconnection procedure.

Embodiments of the present invention use four communication pipes for communication between the HIDs and the unifying receiver. Pipes are logical channels that share the same RF channel. Three HIDs communication pipes are allocated to active HID connections. A fourth service communication pipe is dedicated to the reconnection of HIDs that have been put on-hold.

If an HID that was put on-hold detects user activity (e.g., a button push on a keyboard) and has to reconnect (i.e., reestablish its active connection) to the unifying receiver, the HID is configured to transmit the first report to the unifying receiver via the service pipe. The use of the service pipe to transmit a normal report is an implicit reconnection request. If the unifying receiver receives a report on the service pipe, the unifying receiver is configured to check that the information comes from a paired HID. If the HID is paired to the unifying receiver, the unifying receiver posts the report on the USB and allocates a device pipe to the HID. The HID is then connected and sends all subsequent traffic on the device pipe that was allocated to the HID. If the report is not from a paired HID, the report is discarded by the unifying receiver and the reconnection request is ignored. Note that the HID does not need any information about the device pipe that was allocated to it. Pipe allocation is a "receiver-only" procedure, where an identification byte assigned to the HID during pairing is programmed into the input filter of the device pipe. The described embodiment avoids the exchange of extra service packets before the first useful report can be transmitted. Thereby, the described embodiment provides that reconnection latencies are kept to an amount, which is generally not noticeable by a user.

Putting an HID on hold is presently described. If three connections for three HIDs are active and another HIDs attempts to reconnect to the unifying receiver, the unifying receiver is configured to put one of the active connections for one of the HIDs on-hold before a device pipe is allocated to the reconnecting HID. The selection of the HID to be put on-hold is based on the elapsed time since the last report was received from this HID. Specifically, the HID having the longest period of inactivity is put on-hold. Note that packets sent by an HID to keep the connection active are not taken into account when determining the period of inactivity.

Because it is desirable for the fulfillment of reconnection requests to have short latencies, putting an HID on-hold is an action that should occur relatively quickly. The receiver does not notify the HID that is placed on-hold. Therefore, putting an HID on-hold is a unilateral action of the unifying receiver where the unifying receiver de-allocates a device pipe. When the corresponding HID will realize that the unifying receiver no longer acknowledges any transmissions from the HID, the HID will enter a disconnected state. The next time user activity of the HID is detected by the unifying receiver, this HID will send a report on the service pipe to effect reconnection.

According to one embodiment, the connect utility software operating on the portable computer is configured to re-pair a set of HIDs to a "replacement" unifying receiver where the set of HIDs were paired to a unifying receiver that was lost or damaged. Replacement unifying receivers are typically "blank," meaning that replacement unifying receivers are not paired to any device HIDs. According to one embodiment, the connect utility software is configured to store (e.g., on the machine readable medium of the portable computer) a list of the HIDs paired to a given unifying receiver. According to a further embodiment, the connect utility software may be configured to store a number of lists of HIDs if, for example, a number of unifying receivers are used with the portable computer. Alternatively, the connect utility software may be configured to store one list of all HIDs that are used with various unifying receivers, which are used with the portable computer. A list of HIDs stored may include information useful for re-pairing the HIDs to the replacement unifying receiver.

During a re-pairing process, according to one embodiment, if multiple lists of HIDs are stored in the portable computer's machine readable memory, the connect utility software may be configured to present the multiple lists of HIDs on the portable computer's monitor so that a user may select one of the list of HIDs that the user wishes to re-pair to the replacement unifying receiver. According to an alternative embodiment, the connect utility software may be configured to present a single list of all HIDs used with unifying receivers coupled to the portable computer. The connect utility software may provide a user selection option for selecting specific HIDs to re-pair with the replacement unifying receiver. According to another alternative, if one unifying receiver has been used with the portable computer, the connect utility software will only present the HIDs paired with this one unifying receiver for re-pairing with the replacement unifying receiver. According to one embodiment, the one or more lists of HIDs paired with one or more unifying receivers is updated by the connect utility software on the machine readable memory of the portable computer each time an HID is paired or un-paired with a unifying receiver or if an HID is moved from one unifying receiver to another unifying receiver.

Re-Pairing HIDs to a Replacement Unifying Receiver

Figure 9:
FIG. 9 is a simplified schematic of an example re-pairing GUI that the control utility software may cause to be displayed on the portable computer's display to begin guiding a user through a re-pair process.

According to one embodiment, if a replacement unifying receiver is inserted in a USB port of the portable computer, the connect utility software operating on the portable computer is configured to place a re-pairing GUI on the portable computer's display to guide a user through a re-pairing process of re-pairing a set of HIDs to a replacement unifying receiver. FIG. 9 is a simplified schematic of an example re-pairing GUI that the control utility software may cause to be displayed on the portable computer's display to begin guiding a user through a re-pair process. The re-pairing GUI may be configured to inform the user that the user has inserted a replacement unifying receiver into a USB port of the portable computer. According to one embodiment, the portable computer is configured to determine that a unifying receiver is a replacement unifying receiver via detection of the unifying receiver not being paired to any HIDs. The portable computer may be configured to interrogate the local memory of the unifying receiver to retrieve a lookup table in which information for paired HIDs is stored. If the lookup table is essentially blank (e.g., no information is recorded for paired HIDs), then the portable computer is configured to determine that the unifying receiver is a replacement unifying receiver.

The re-pairing GUI may include graphics and/or the like to indicate to the user that no HIDs are currently paired to the replacement unifying receiver. The re-pairing GUI may be configured to ask the user whether the user would like to re-pair a set of HIDs to a replacement unifying receiver where the original unifying receiver to which the HIDs are paired is lost or damaged. The re-pairing GUI may include screen buttons or the like by which the re-pairing GUI (and hence the connect utility software) may receive an input from the user indicating whether the user would like to re-pair a set of HIDs to the replacement unifying receiver. If the user indicates that they would not like to re-pair the set of HIDs to the replacement unifying receiver the re-pairing method ends.

Figure 10:
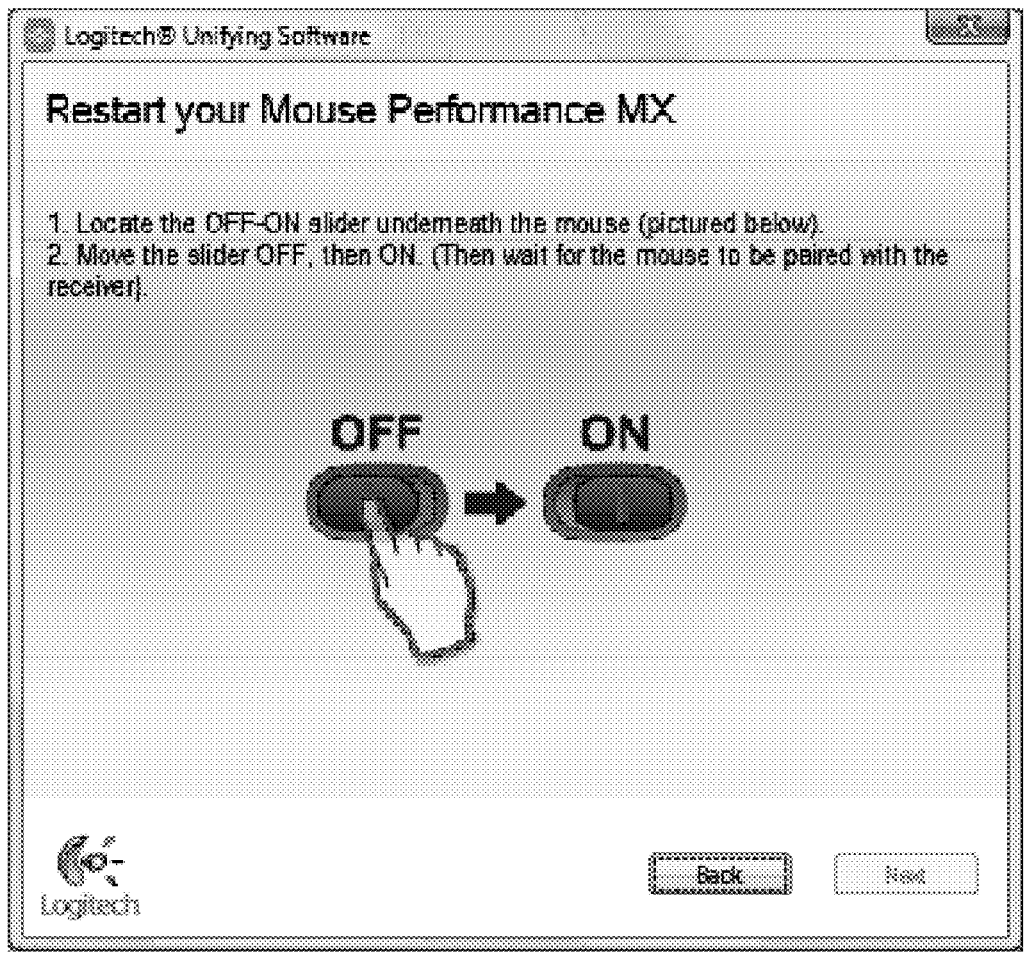
FIG. 10 is an example GUI that the connect utility software may be configured to have displayed on the display of the portable computer to direct a user to restart the users "Mouse Performance MX" (i.e., a specific type of mouse) to re-pair the mouse to the replacement unifying receiver.
Figure 11:
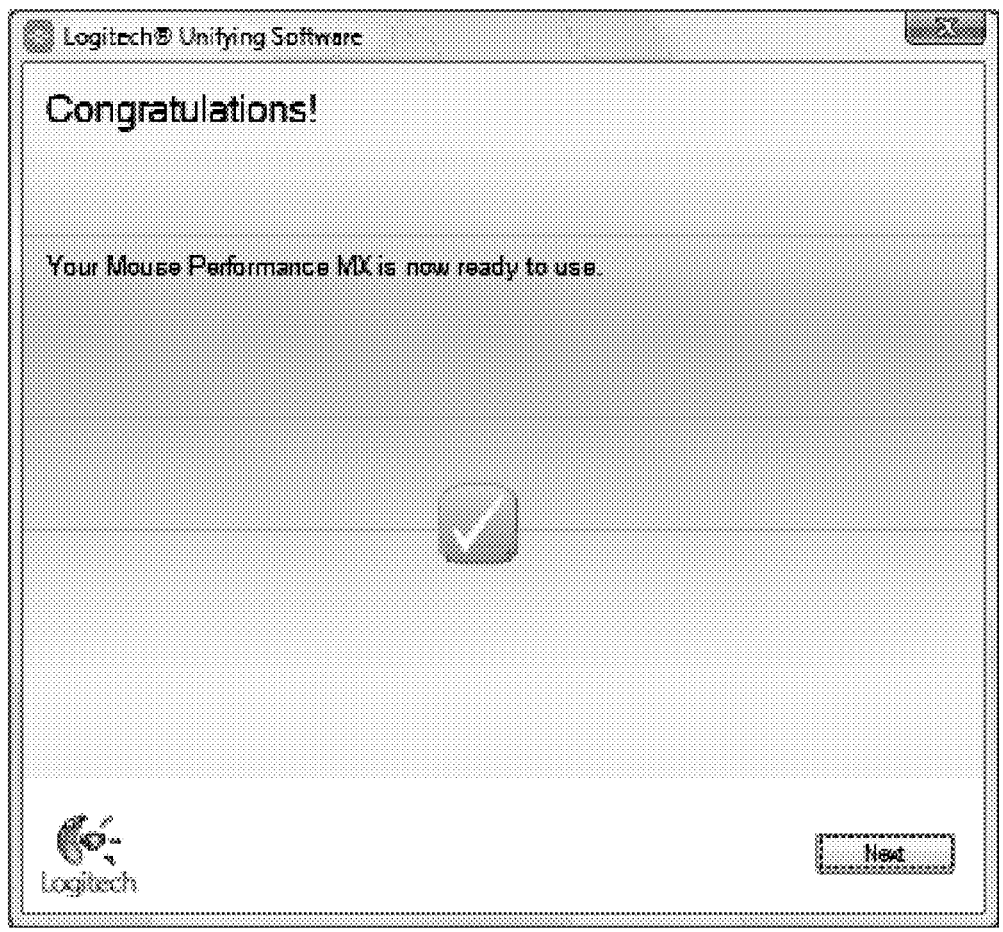
FIG. 11 is an example GUI that indicates the successful pairing and that may be displayed on the portable computer.
Figure 12:
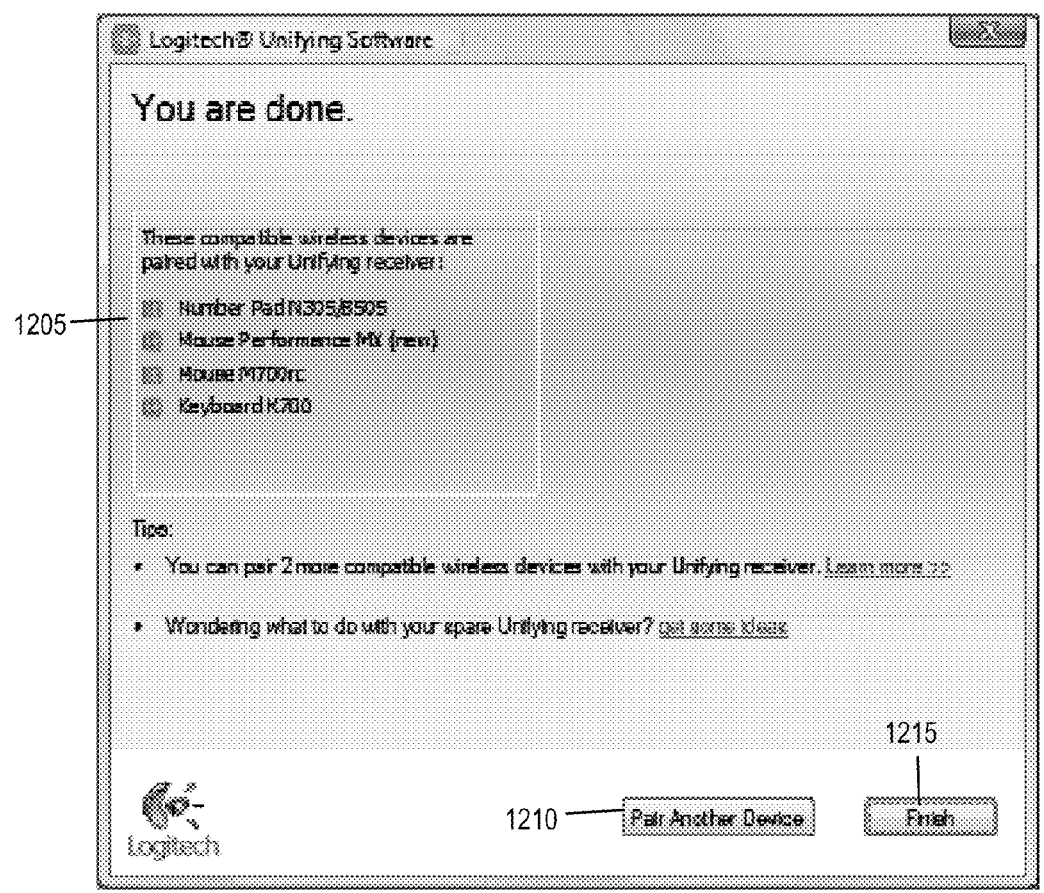
FIG. 12 is an example GUI that the connect utility software may be configured to display on the portable computer's display to indicate that all HIDs have been re-paired to the replacement unifying receiver.

According to one embodiment, if the connect utility software receives an input from the user via the re-pairing GUI that the user would like to re-pair the user's set of HIDs to the replacement unifying receiver, then the connect utility software presents a subsequent set of GUI to guide the user to re-pair each HID to the replacement unifying receiver. The re-pairing process is substantially similar to the process for pairing an HID to a different unifying receiver from an original unifying receiver to which the HID is paired. The connect utility software may be configured to display a GUI or the like that directs a user to restart (e.g., power off and then power on) a select one of the HIDs that the user wishes to re-pair to the replacement unifying receiver. FIG. 10 is an example GUI 1000 that the connect utility software may be configured to have displayed on the display of the portable computer to direct a user to restart the users "Mouse Performance MX" (i.e., a specific type of mouse) to re-pair the mouse to the replacement unifying receiver. GUI 1000 may include text and graphics to aid the user in restarting the user's HID. Specific details of pairing an HID to a unifying receiver is described above in detail. If the HID is successfully re-paired to the replacement unifying receiver, the connect utility software may be configured to indicate the successful re-pairing to the user. For example, the connect utility software may be configured to control the portable computer to display a GUI to indicate the successful re-pairing. FIG. 11 is an example GUI 1100 that indicates the successful pairing and that may be displayed on the portable computer. The GUI indicating successful re-pairing may includes a screen button (e.g., the "Next" screen button) or the like to indicate that there are other HIDs in the list of HIDs that may be re-paired to the replacement unifying receiver. If the "Next" screen button is selected, then the connect utility software may guide the user through the re-pairing of another HID to the replacement unifying receiver. If all of the user's HIDs have been re-paired to the replacement unifying receiver, the connect utility software may be configured to indicate to the user that all HIDs have been re-paired. FIG. 12 is an example GUI 1200 that the connect utility software may be configured to display on the portable computer's display to indicate that all HIDs have been re-paired to the replacement unifying receiver. GUI 1200 may include a list 1205 of all of the HIDs that have been re-paired to the replacement unifying receiver. GUI 1200 may provide a screen selectable option 1210 for pairing other HIDs to the replacement unifying receiver, and may also provide a screen selectable option 1215 for stopping the re-pairing process. While the above re-pair method discusses the use of GUIs to guide the user through a re-pairing process, other interfaces on the portable computer may be used to guide the user through re-pairing, such as text instructions, audible instruction, and the like.

Multi-Master Devices

According to the various embodiments described above, an HID is configured to be paired to a single unifying receiver. The pairing of an HID to a single unifying receiver is referred to as a "single master" configuration. In the single master configuration, the HID stores in the HIDs local memory the unifying receiver address and the encryption key associated with the wireless link to the unifying receiver. If the HID (in a single-master configuration) is paired to a second unifying receiver, the HID is configured to overwrite, in local memory, the address of the first unifying receiver with the address of the second unifying receiver, and overwrite the encryption key for the wireless link with the first unifying receiver with the encryption key for the wireless link with the second unifying receiver. That is, the HIDs "un-pairs" with the first unifying receiver and then pairs with the second unifying receiver. The local memory of the HID in the single master configuration may be represented by Table 1 below.

TABLE 1

| Receiver address | Encryption key |
|---|---|
| address #1 | key #1 |

According to an alternative embodiment of the present invention, an HID may pair to a plurality of unifying receivers. The pairing of an HID to a plurality of unifying receivers is referred to as a multi-master configuration. In a multi master configuration, for example, a first unifying receiver may be inserted into a USB port of a first portable computer, and a second unifying receiver may be inserted into a USB port of a second portable computer. The HID being paired to the first and the second unifying receivers may be configured to interact with both of the unifying receivers and control both the first and the second portable computers. While the foregoing example describes an HID paired to two unifying receivers, an HID according to the presently described embodiment, may be paired to more than two unifying receivers. Further, each unifying receiver may be configured to pair to a plurality of HIDs as described above.

An HID in a multi-master configuration is configured to store in local memory the addresses of the plurality of unifying receivers to which the HID is paired, and is configured to store in local memory the encryption keys of the wireless links to the plurality of unifying receivers. The local memory of the HID in the multi-master configuration may be represented by Table 2 below.

TABLE 2

| Receiver address | Encryption key | Priority |
|---|---|---|
| address #1 | key #1 | 3 |
| address #2 | key #2 | 1 |
| address #3 | key #3 | 4 |
| address #4 | key #4 | 2 |

According to an alternative embodiment (in both the multi-master configuration and the single master configuration), the configuration/pairing information (e.g., addresses, encryption keys, priority levels, etc.) are stored by the software located on the portable computer, and may be stored in the portable computer's memory.

According to one embodiment of the present invention, a priority level is set for each unifying receiver to which an HID is paired. The priority levels for the unifying receivers are set based on the temporal length from which the HID had an active connection with each of the unifying receivers. For example, the unifying receiver to which the HID had the most recent temporal connection is assigned the highest priority (e.g., 1). The unifying receiver to which the HID had the second most recent temporal connection is assigned the next highest priority (e.g., 2). The unifying receiver to which the HID had the third most recent temporal connection is assigned the next highest priority (e.g., 3). The unifying receiver to which the HID had the temporally oldest connection is assigned the lowest priority (e.g., 4). It will be understood that an HID in a multi-master configuration may be paired to more or less than 4 unifying receivers and that the foregoing described embodiment is exemplary.

If an HID in a multi-master configuration has data to transmit to a unifying receiver, the HID is configured to attempt to reconnect to the unifying receiver having the highest priority level, which is stored in the HID's local memory. If the reconnection to the unifying receiver having the highest priority is successful, the HID will transmit the data to this unifying receiver. If the reconnection to the unifying receiver having the highest priority level fails, the HID will attempt to reconnect to the unifying receiver that is assigned the second highest priority. The attempt at reconnection will continue until all unifying receivers have been tried, or until reconnection to one of the unifying receivers is successful. The unifying receiver to which the HID successfully connects will be sent the data from the HID. If the HID reconnects to a unifying receiver that is not the unifying receiver that is assigned the highest priority, the priorities in the local memory of the HID are reassigned. The unifying receiver to which the HID reconnected is assigned highest priority for future reconnections. According to one specific embodiment, the HID is configured to lower by one the priority levels of all other unifying receivers. The priority levels of the other unifying receivers may be lowered by other amounts according to alternative formulas. For example, the unifying receiver that previously had the highest priority will be assigned the second highest priority, and so on. Note that while a HID in a multi-master configuration may be simultaneously paired to several unifying receivers, the HID may have an active connection with one of the unifying receivers at any given time. Accordingly, only one unifying receiver at a given time will be able to receive data transmitted by the HID.

It is to be understood that the examples and embodiments described above are for illustrative purposes only, and that various modifications or changes in light thereof will be suggested to persons skilled in the art, and are to be included within the spirit and purview of this application and scope of the appended claims. For example, the specification in several places discusses the use of the unifying receiver and the enumerator software with a portable computer. The portable computer can be any computer (desk top computer, notebook computer, tablet computer, etc.) configured for use by a human. Further, the enumerator software may in some embodiment be firmware, hardware, or a combination thereof. Further, the use of the term software herein includes software code, compiled code, and instructions operating on the personal computer from execution of compiled code on processor or other components of the personal computer. Further, while the specification describes HIDs as being configured to pair to the unifying receiver, other peripheral devices, such as wireless printers, scanners, and the like may be paired to the unifying receiver. Further, while various GUI have been described for guiding a user through various processes for pairing, re-pairing, discovering, etc, it should be understood that various devices (text, audible instruction, etc.) that do not include GUI's may be used to guide a user through a process. Therefore, the above description should not be understood as limiting the scope of the invention as defined by the claims.

What is claimed is:

1. A computerized method of pairing a peripheral device to a receiver coupled to a computer, the computerized method comprising:
    launching by a computer a connect utility configured to direct a receiver coupled to a connector of the computer to enter a pairing mode;
    receiving by the computer input for directing the connect utility to place the receiver in a pairing mode;
    directing the receiver to enter pairing mode based on the received input;
    directing a user by the computer to switch a slider switch on the peripheral device from off to on to place the peripheral device in a pairing mode, wherein the receiver is configured to pair with the peripheral device if the receiver and peripheral device are both in pairing mode; and the receiver is configured to not pair with the peripheral device if the receiver or the peripheral device is not in pairing mode;
    detecting by the computer another receiver coupled to another connector of the computer for a set of peripheral devices;
    presenting by the computer a user query to a user for pairing the set of peripheral devices to the first mentioned receiver;
    receiving by the computer a user response to the query;
    if the user response includes an indicator for pairing the set of peripheral devices to the first receiver:
        directing the user to unplug the other receiver from the computer,
        directing the first receiver to enter a pairing mode, and
        directing a user by the computer to switch a set of slider switches on the set of peripheral devices from off to on to place the set of peripheral devices in a pairing mode, wherein the first receiver is configured to pair with the set of peripheral devices if the first receiver and set of peripheral devices are both in pairing mode; and the first receiver is configured to not pair with the set of peripheral devices if the set of peripheral devices is not in pairing mode; and
    if the user response includes an indicator for not pairing the set of peripheral devices to the first receiver:
        maintaining the pairing of the first peripheral device to the first receiver; and
        maintaining the pairing of the set of peripheral devices to the other receiver.

2. The computerized method of claim 1, wherein the peripheral devices include human interface devices.

3. A peripheral device configured to communicate with a receiver over a wireless connection, the peripheral comprising:
    a communication device paired with a first receiver and configured to communicate with the first receiver over a wireless connection; and
    a slider switch coupled to the communication device and configured to slide from an off state to an on state to power on the communication device, wherein:
    the communication device is configured to attempt to connect over the wireless connection to the first receiver, if the slider switch is slid from the off state to the on state,
    the communication device is configured to not enter a pairing mode, if the communication device connects to the first receiver after the slider switch is slid from the off state to the on state,
    the communication device is configured to enter pairing mode for a period of time and search for a second receiver in pairing mode to pair with, if the communication device does not connect to the first receiver after the slider switch is slid from the off state to the on state, the communication device is configured to pair with the second receiver and exit pairing mode after pairing with the second receiver, if the second receiver is located in pairing mode, and the communication device is configured to exit pairing mode, if the second receiver is not located in pairing mode.

4. The peripheral device of claim 3, wherein the period of time is about 500 milliseconds or less.

5. The peripheral device of claim 3, wherein the communication device includes a processor and a transceiver.

6. The peripheral device of claim 3, wherein the peripheral device is a human interface device.

7. A computerized method for re-pairing a set of peripheral devices from a first unifying receiver to a replacement unifying receiver comprising:

detecting by a computer the replacement unifying receiver inserted in a communication port of the computer;

receiving by the computer a user input instructing the computer to re-pair the set of peripheral devices to the replacement unifying receiver;

until a last peripheral device is re-paired to the replacement unifying receiver or until a stop command is received by the computer from a user to stop re-pairing the set of peripheral devices to the replacement unifying receiver, repeating the steps of:

directing the replacement unifying receiver to enter pairing mode;

directing a user via the computer to switch a slider switch on the peripheral device from off to on to place the peripheral device in a pairing mode; and re-pairing the peripheral device to the replacement unifying receiver.

8. The computerized method of claim 7, wherein prior to re-pairing the set of peripheral devices to the replacement unifying receiver, the replacement unifying receiver is not paired to other peripheral devices.

9. The computerized method of claim 7, wherein the communication port is a USB port.

10. The computerized method of claim 7, wherein the detecting step includes interrogating a lookup table in the replacement unifying receiver to determine whether the lookup table is blank to determine that the replacement unifying receiver is configured for re-pairing to the set of peripheral devices.

\* \* \* \* \*